United States Patent
Ruhe, Jr. et al.

(10) Patent No.: US 10,815,446 B2
(45) Date of Patent: Oct. 27, 2020

(54) DISPERSANTS, METHOD OF MAKING, AND USING SAME

(71) Applicant: Chevron Oronite Company LLC, San Ramon, CA (US)

(72) Inventors: William Raymond Ruhe, Jr., Benicia, CA (US); Georgeta Masson, Lafayette, CA (US); Abran Costales, El Cerrito, CA (US); Kirk Nass, San Francisco, CA (US); John Robert Miller, San Rafael, CA (US); Young A. Chang, San Jose, CA (US)

(73) Assignee: CHEVRON ORONITE COMPANY LLC, San Ramon, CA (US)

(*) Notice: Subject to any disclaimer, the term of this patent is extended or adjusted under 35 U.S.C. 154(b) by 0 days.

(21) Appl. No.: 15/983,161

(22) Filed: May 18, 2018

(65) Prior Publication Data

US 2018/0334635 A1  Nov. 22, 2018

Related U.S. Application Data

(60) Provisional application No. 62/508,559, filed on May 19, 2017.

(51) Int. Cl.
| | | |
|---|---|---|
| *C10M 159/12* | (2006.01) | |
| *C10M 149/10* | (2006.01) | |
| *C08F 110/10* | (2006.01) | |
| *C10M 169/04* | (2006.01) | |
| *C10M 149/22* | (2006.01) | |
| *C10M 133/56* | (2006.01) | |

(52) U.S. Cl.
CPC ......... *C10M 149/10* (2013.01); *C08F 110/10* (2013.01); *C10M 133/56* (2013.01); *C10M 149/22* (2013.01); *C10M 159/12* (2013.01); *C10M 169/041* (2013.01); *C08F 2810/30* (2013.01); *C10M 2203/003* (2013.01); *C10M 2207/028* (2013.01); *C10M 2215/28* (2013.01); *C10M 2217/06* (2013.01); *C10M 2219/046* (2013.01); *C10M 2223/045* (2013.01); *C10N 2220/021* (2013.01); *C10N 2230/041* (2013.01); *C10N 2230/12* (2013.01); *C10N 2240/10* (2013.01); *C10N 2240/104* (2013.01); *C10N 2260/06* (2013.01); *C10N 2260/09* (2013.01); *C10N 2270/02* (2013.01)

(58) Field of Classification Search
CPC ............ C10M 149/10; C10M 169/041; C10M 2217/06; C10M 2203/003; C08F 110/10; C08F 2810/30; C10N 2230/041; C10N 2230/12; C10N 2240/10
See application file for complete search history.

(56) References Cited

U.S. PATENT DOCUMENTS

| | | | |
|---|---|---|---|
| 7,361,629 B2 | 4/2008 | Loper et al. | |
| 8,324,139 B2 | 12/2012 | Gieselman | |
| 8,530,397 B2 | 9/2013 | Bera et al. | |
| 8,557,753 B2 | 10/2013 | Gieselman et al. | |
| 8,569,217 B2 | 10/2013 | Gieselman et al. | |
| 8,969,266 B2 | 3/2015 | Crawley et al. | |
| 2005/0153849 A1 | 7/2005 | Mishra et al. | |
| 2008/0293600 A1 | 11/2008 | Goldblatt et al. | |
| 2011/0287992 A1 | 11/2011 | Goldblatt et al. | |
| 2013/0303415 A1* | 11/2013 | Jones | C10M 141/06 508/255 |

FOREIGN PATENT DOCUMENTS

| | | |
|---|---|---|
| EP | 0889112 A1 | 1/1999 |
| EP | 1387066 | 2/2004 |
| EP | 2075315 | 7/2009 |
| EP | 2379686 | 10/2011 |

\* cited by examiner

*Primary Examiner* — Taiwo Oladapo
(74) *Attorney, Agent, or Firm* — Michael Sungjoon Pio

(57) ABSTRACT

Disclosed is a dispersant composition, suitable for use in lubricating oils. The dispersant composition is a reaction product of (i) a polyalkenyl succinimide post-treated with a post-treating agent selected from the group consisting of an organic carbonate, an epoxide, a lactone, a hydroxyaliphatic carboxylic acid, and combinations thereof; and (ii) an acylating agent.

16 Claims, No Drawings

DISPERSANTS, METHOD OF MAKING, AND USING SAME

CROSS-REFERENCE TO RELATED APPLICATIONS

This application claims the benefit of and priority to U.S. Provisional Application Ser. No. 62/508,559, filed May 19, 2017.

FIELD

The present disclosure generally relates to an improved dispersant additive composition that is used in engine oils. More generally, the disclosure relates to a class of dispersants with improved properties, such as soot dispersancy.

BACKGROUND

It is known to employ nitrogen containing dispersants and/or detergents in the formulation of lubricating oil compositions. Many of the known dispersant/detergent compounds are based on the reaction of an alkyl or alkenylsuccinic acid or anhydride with an amine or polyamine to produce an alkyl or alkenylsuccinimide or an alkyl or alkenyl succinamic acid as determined by selected conditions of reaction. One problem facing the lubricant manufacturer is dispersancy of particulate matter in internal combustion engines. Failure to have adequate particulate matter dispersancy may result in filter plugging, sludge accumulation, oil thickening and wear.

DESCRIPTION OF RELATED ART

U.S. Pat. No. 7,361,629 discloses an amination product which contains a hydrocarbyl substituted succinic acylating agent and a mixture comprising aliphatic polyamine and aromatic polyamine.

U.S. Pat. No. 8,324,139 discloses Mannich post-treatment of PIBSA dispersants for soot dispersion.

U.S. Pat. No. 8,530,397 discloses Michael adducts of N-substituted phenylenediamines.

U.S. Pat. No. 8,557,753 and U.S. Pat. No. 8,969,266 disclose an amine-functionalized additive which is derived from amine having at least 3 aromatic groups, at least one —$NH_2$ functional group, and at least 2 secondary or tertiary amino groups.

U.S. Pat. No. 8,569,217 discloses a reaction product of an aromatic amine and a carboxylic functionalized polymer.

U.S. Patent Application Publication No. 2008/0293600 discloses dispersant polymer containing a graft polymer of polymer backbone having graftable sites, acylating agent having point of olefinic unsaturation, ethylenically unsaturated, aliphatic or aromatic monomer and amine.

U.S. Patent Application Publication No. 2011/0287992 discloses a multifunctional multiple graft monomer low molecular weight polymer containing a graft low molecular weight polymer.

U.S. Patent Application Publication No. 2005/0153849 discloses graft copolymer with a polymer backbone that has been grafted with certain amines.

European Patent Application No. 0889112 discloses bis-succinimide compounds having an amide linking group.

Thus, herein post-treated PIBSA dispersants are reported with ester and ester-amines and compositions containing same. These additives and compositions demonstrated improved soot handling performance in engine oils when compared with industry standard dispersant additives.

SUMMARY

In a first aspect, there is provided an oil soluble or dispersible dispersant composition comprising the reaction product of: (i) a polyalkenyl succinimide post-treated with a post-treating agent selected from the group consisting of an organic carbonate, an epoxide, a lactone, a hydroxyaliphatic carboxylic acid, and combinations thereof; and (ii) an acylating agent selected from one of the following structures (a) through (c):

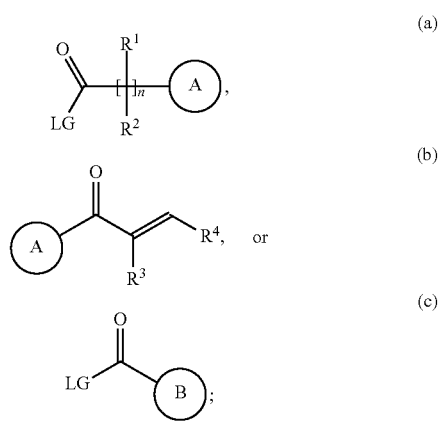

wherein LG is a leaving group capable of being displaced in an acylation reaction; each of $R^1$, $R^2$, $R^3$, and $R^4$ is independently selected from hydrogen, alkyl, and aryl; n is from 1 to 28; Ⓐ is an amine moiety; and Ⓑ is an aromatic, heteroaromatic, alkaryl, or alkheteroaryl moiety having from 4 to 20 carbon atoms.

In a second aspect, there is provided a lubricating oil additive concentrate comprising from 80 to 20 wt. % of an organic liquid diluent and from 20 to 80 wt. % of the dispersant composition as described herein.

In a third aspect, there is provided a method for controlling soot-induced viscosity increase in a compression ignition engine lubricated with a lubricating oil by using as the lubricating oil the lubricating oil composition described herein.

In a fourth aspect, there is provided a method for improving lead corrosion performance in a compression ignition engine lubricated with a lubricating oil by using as the lubricating oil the lubricating oil composition described herein, wherein the lubricating oil is one that is determined to be corrosive to lead according to the High Temperature Corrosion Bench Test ASTM D6594 when the dispersant composition of the present disclosure is not present.

In a fifth aspect, there is provided there is provided a process for preparing a dispersant composition which comprises reacting a mixture comprising components (i) and (ii) as described herein above.

DETAILED DESCRIPTION

Definitions:

The following terms used with the description are defined as such:

The term "PIB" is an abbreviation for polyisobutene.

The term "PIBSA" is an abbreviation for polyisobutenyl or polyisobutyl succinic anhydride.

The term "succinimide" is understood in the art to include many of the amide, imide, and amidine species which may be formed by the reaction of a succinic anhydride with an amine. The predominant product, however, is a succinimide and this term has been generally accepted as meaning the product of a reaction of an alkenyl- or alkyl-substituted succinic acid or anhydride with an amine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746.

The terms 'oil soluble' or 'oil dispersible' as used herein do not necessarily indicate that the compounds or additives are soluble, dissolvable, miscible or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

The term "leaving group" or "LG" means the group with the meaning conventionally associated with it in synthetic organic chemistry, i.e., an atom or group displaceable under substitution reaction conditions.

The term "post-treating agent" refers to organic reagents capable of functionalizing amines.

The term "Total Base Number" or "TBN" as used herein refers to the amount of base equivalent to milligrams of KOH in 1 gram of sample (mg KOH/g). Thus, higher TBN numbers reflect more alkaline products, and therefore a greater alkalinity reserve. The TBN of a sample can be determined by ASTM D2896, D4739, or any other equivalent procedure.

As used herein, reference to the amounts of additives present in the lubricating composition disclosed are quoted on an oil free basis, i.e., the amount of actives, unless otherwise indicated.

In an aspect, the present disclosure provides an oil soluble or dispersible dispersant composition comprising the reaction product of: (i) a polyalkenyl succinimide post-treated with a post-treating agent selected from the group consisting of an organic carbonate, an epoxide, a lactone, and a hydroxyaliphatic carboxylic acid, and combinations thereof; and (ii) an acylating agent selected from one of the following structures (a) through (c):

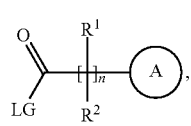

(a)

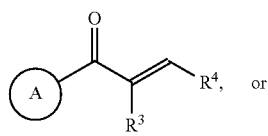

(b)

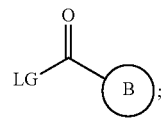

(c)

where LG is a leaving group capable of being displaced in an acylation reaction; each of $R^1$, $R^2$, $R^3$, and $R^4$ is independently selected from H, alkyl, aryl, heteroaryl, alkaryl, and alkheteroaryl; n is from 1 to 28; Ⓐ is an amine moiety; and Ⓑ is an aromatic, heteroaromatic, alkaryl, or alkheteroaryl moiety having from 4 to 20 carbon atoms. Suitable leaving group (LG) include a halide (e.g., Br, Cl, I), a $C_1$-$C_4$ alkoxy (e.g., methoxy, ethoxy), and an optionally substituted aryloxy (e.g., phenoxy, p-nitrophenoxy, pentafluorophenoxy).

Polyalkenyl Succinimide

In one embodiment, a polyalkenyl bis-succinimide can be obtained by reacting a polyalkenyl-substituted succinic anhydride of structure (d):

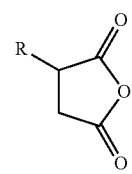

(d)

(wherein R is a polyalkenyl substituent is derived from a polyalkene group having a number average molecular weight of from about 500 to about 3000) with a polyamine. In one embodiment, R is a polyalkenyl substituent is derived from a polyalkene group having a number average molecular weight of from about 1000 to about 2500. In one embodiment, R is a polyisobutenyl substituent derived from a polyisobutene having a number average molecular weight of from about 500 to about 3000. In another embodiment, R is a polyisobutenyl substituent derived from a polyisobutene having a number average molecular weight of from about 1000 to about 2500.

Suitable polyamines for use in preparing the bis-succinimide dispersants include polyalkylene polyamines. Such polyalkylene polyamines will typically contain about 2 to about 12 nitrogen atoms and about 2 to 24 carbon atoms. Particularly suitable polyalkylene polyamines are those having the formula: $H_2N$—$(R'NH)_x$—H wherein R' is a straight- or branched-chain alkylene group having 2 or 3 carbon atoms and x is 1 to 9. Representative examples of suitable polyalkylene polyamines include ethylenediamine, diethylenetriamine, triethylenetetraamine, tetraethylenepentamine, pentaethylene hexamine, and heavy polyamines (e.g., Ethyleneamine E-100, available from Huntsman Corporation).

Generally, the polyalkenyl-substituted succinic anhydride of formula (1) is reacted with the polyamine at a temperature of about 130° C. to 220° C. (e.g., 145° C. to 175° C.). The reaction can be carried out under an inert atmosphere, such as nitrogen or argon. Generally, a suitable molar charge of polyamine to polyalkenyl-substituted succinic anhydride is from about 0.35:1 to about 0.75:1 (e.g., 0.4:1 to 0.5:1). As used herein, the "molar charge of polyamine to polyalkenyl-substituted succinic anhydride" means the ratio of the number of moles of polyamine to the number of succinic groups in the succinic anhydride reactant.

One class of suitable polyalkenyl succinimides may be represented by the following structure (e):

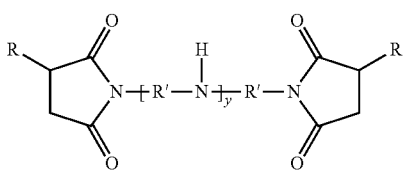

(e)

wherein R and R' are as described herein above and y is 1 to 11.

Post-Treatment of Polyalkenyl Succinimide

The polyalkenyl succinimide is post-treated by conventional methods by reaction with a suitable post-treating agent to at least partially convert basic dispersant amino groups to non-basic moieties (e.g., carbamate groups) and to provide a hydroxy-functionalized polyalkenyl succinimide. Suitable post-treating agents herein include organic carbonates, epoxides, lactones, and hydroxyaliphatic carboxylic acids.

Suitable organic carbonates ethylene carbonate (EC), propylene carbonate (PC), butylene carbonate (BC), and glycerine carbonate.

Reaction of an organic carbonate with a polyamino polyalkenyl-substituted succinimide may yield a mixture of products. When the molar charge of the organic carbonate to the basic nitrogen of the succinimide is 1 or less, it is anticipated that a large portion of the basic amines of the succinimide will be converted to hydroxy hydrocarbyl carbamic esters. When the mole ratio greater than 1, poly(oxyalkylene) polymers of the carbamic esters are expected.

The molar charge of organic carbonate employed in the post-treatment reaction is preferably based upon the theoretical number of basic nitrogen atoms contained in the polyamino substituent of the succinimide. Thus, for example, when one equivalent of tetraethylene pentamine ("TEPA") is reacted with two equivalents of succinic anhydride, the resulting bis-succinimide will theoretically contain 3 basic nitrogen atoms per molecule. Accordingly, a molar charge of 2 would require that two moles of organic carbonate be added for each basic nitrogen atom or, in this case, 6 moles of organic carbonate for each mole equivalent of polyalkenyl-substituted succinimide prepared from TEPA. Mole ratios of the organic carbonate to the basic amine nitrogen of the polyamino alkenyl succinimide are typically in the range of from about 1:1 to 4:1 (e.g., about 2:1 to 3:1).

Post-treatment of nitrogen-containing dispersants by reaction with organic carbonates is described, for example, in U.S. Pat. Nos. 4,612,132; 5,334,321; 5,356,552; 5,716,912; 5,849,676; and 5,861,363.

Suitable epoxides include $C_2$-$C_{30}$ hydrocarbyl epoxides such as ethylene oxide, propylene oxide, butylene oxide, styrene oxide, and the like. The hydrocarbyl epoxide may be a hydroxy functionalized epoxide such as glycidol. The epoxide may be a mono- or polyepoxide. Post-treatment of nitrogen-containing dispersants by reaction with epoxides is described, for example, in U.S. Pat. Nos. 3,367,943; 3,373,111; 4,617,137; 5,026,495; and 5,328,622.

Suitable hydroxyaliphatic carboxylic acids include glycolic acid, lactic acid, 3-hydroxypropionic acid, 2,2-bis(hydroxymethyl)propionic acid, and the like. Post-treatment of nitrogen-containing dispersants by reaction with hydroxyaliphatic carboxylic acids is described, for example, in U.S. Pat. Nos. 4,482,464; 4,521,318; 4,663,064 and 4,713,189.

Suitable lactones include β-propiolactone, γ-butyrolactone, δ-valerolactone, γ-valerolactone, ε-caprolactone, δ-caprolactone, and the like. Post-treatment of nitrogen-containing dispersants by reaction with lactones is described, for example, in U.S. Pat. No. 4,617,138; 4,645,515; 4,963,275; and 4,971,711.

Acylating Agent

The post-treated polyalkenyl succinimide is reacted with an acylating agent to provide a dispersant composition. The acylating agent has the following structure (f):

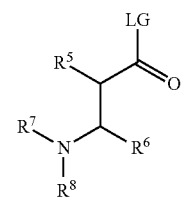

(f)

wherein each of $R^5$ and $R^6$ is independently selected from H, $C_1$-$C_{30}$ alkyl, $C_3$-$C_8$ cycloalkyl, or aryl; and each of $R^7$ and $R^8$ is independently selected from H, $C_1$-$C_{30}$ alkyl, $C_3$-$C_8$ cycloalkyl, aryl, 3-propionyl acid, and 3-propionyl acid ester or when taken together to the nitrogen atom to which they are attached form a nitrogen-containing heterocycle; and LG is a leaving group as described herein above. The nitrogen-containing heterocycle may be, for example, an aziridine, a pyrrole, a pyrrolidine, a piperidine, an imidazole, a carbazole, an indoline, a thiazole, a thiazine, a thiadiazole, or a morpholine. The nitrogen-containing heterocycle can be substituted or unsubstituted.

In one embodiment, the acylating agent is selected from one of the following structures (g) through (q):

(g)

(h)

(i)

(j)
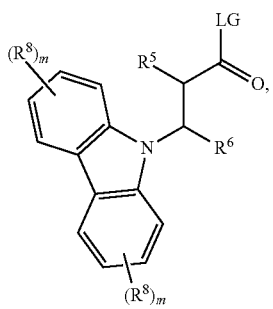
(k)
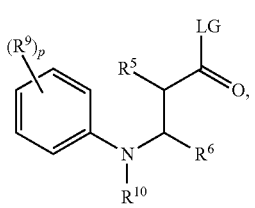
(l)
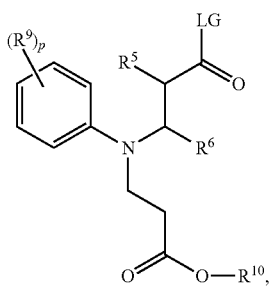
(m)
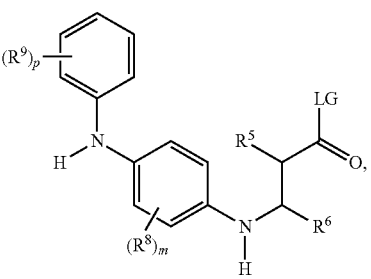
(n)
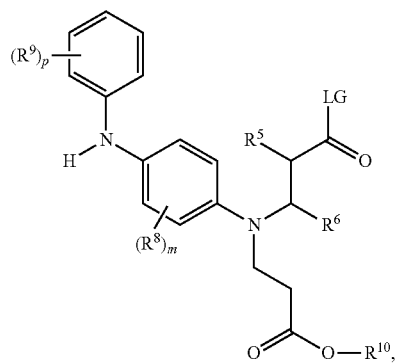
(o)
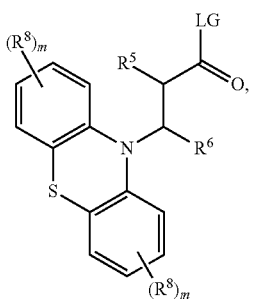
(p)
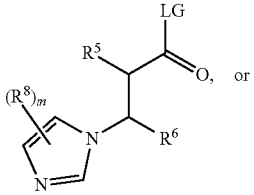
(q)
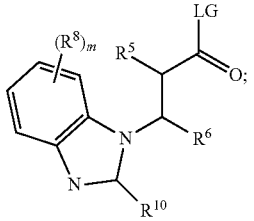
wherein $R^5$ and $R^6$ are as defined as above; each of $R^7$, $R^8$, $R^9$, $R^{10}$ and $R^{11}$ is independently selected from H, alkyl, aryl, heteroaryl, alkaryl, and alkheteroaryl; m is an integer from 0 to 4; and p is an integer from 0 to 5.
In one embodiment, the acylating agent is selected from one of the following structures (r) through (dd):
(r)
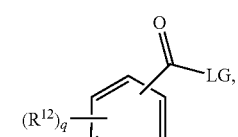
(s)
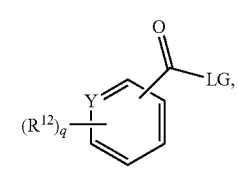
(t)
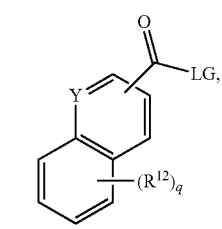

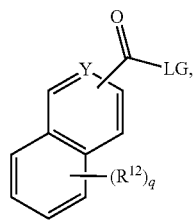
(u)

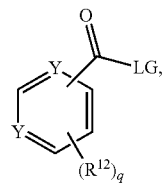
(v)

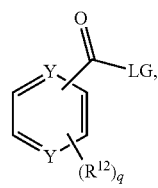
(w)

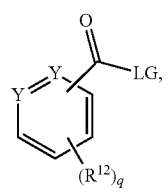
(x)

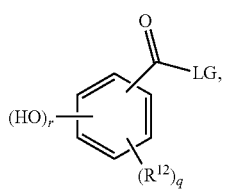
(y)

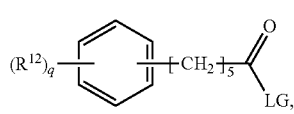
(z)

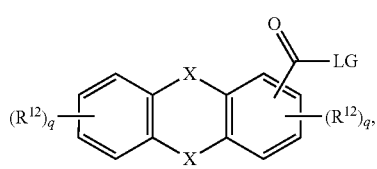
(aa)

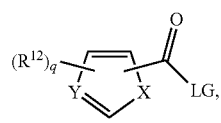
(bb)

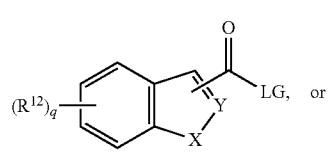
(cc)

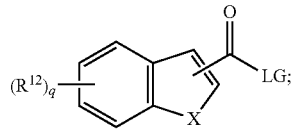
(dd)

where LG is a leaving group capable of being displaced in an acylation reaction; each X is independently selected from $CH_2$, O, S, and NR, where R is H or aryl, heteroaryl, alkyl, alkaryl, or alkheteroaryl; and each Y is independently selected from CH and N, each $R^{12}$ is independently selected from hydrogen, alkyl and aryl; q is an integer from 0 to 5; r is an integer from 0 to 5; and s is an integer from 1 to 10.

In an aspect, the acylating agent has the following structure (ee):

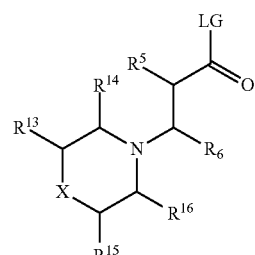
(ee)

where each of $R^5$ and $R^6$ is independently selected from H, $C_1$-$C_{30}$ alkyl, $C_3$-$C_8$ cycloalkyl, and aryl; LG is leaving group capable of being displaced in an acylation reaction; X is absent or selected from the group consisting of O, S, or NR, where R is H, $C_1$-$C_{30}$ alkyl, $C_3$-$C_8$ cycloalkyl, alkaryl, or aryl; and $R^{13}$, $R^{14}$, $R^{15}$, $R^{16}$ are independently hydrogen and one or more of the pairs $R^{13}/R^{14}$ and $R^{15}/R^{16}$ can together form an optionally substituted carbocyclic or heterocyclic ring. In one embodiment, the carbocyclic ring can be aromatic or heteroaromatic. Suitable leaving groups (LG) include halogen (e.g., Br, Cl, I), $C_1$-$C_4$ alkoxy (e.g., methoxy, ethoxy) and optionally substituted aryloxy (e.g., phenoxy, p-nitrophenoxy, pentafluorophenoxy).

Processes for Preparing the Dispersant Composition

The dispersant composition of the present disclosure may be prepared by conventional direct esterification or transesterification methods. Typical catalysts are organometallic compounds of various metals such as scandium, zirconium, chromium, iron, nickel, copper, zinc, zirconium, ruthenium, rhodium, palladium, silver, cadmium, indium, tin, hafnium, titanium, osmium, iridium, platinum, gold, and lead. Representative examples of organometallic catalysts include dialkyltin dichloride, dialkyltin oxide, dialkyltin diacetate, dialkyltin maleate, tin tetrachloride, tin triflate, tin (II) 2-ethylhexanoate, titanium (IV) isopropoxide, titanium (IV) acetylacetonate, zirconium (IV) isopropoxide, zirconium (IV) tert-butoxide, zirconium (IV) acetylacetonate, zirconium (IV) 2-ethylhexanoate, zirconium (IV) acetate hydroxide, hafnium (IV) isopropoxide, and hafnium (IV) tert-butoxide. Suitable conditions include a temperature 100° C. to 250° C. for a time from 0.5 hours to 24 hours.

The catalyst concentration may be varied in wide ranges and may be varied as a function of the type of catalyst. The catalyst concentration may be from 0.005 to 2.5 wt. %, based on the reaction mixture, alternatively, from 0.01 to 1.0 wt. %, and alternatively, from 0.01 to 0.5 wt. %.

The charge mole ratio (CMR) of the acylating agent and the post-treated polyalkenyl succinimide can vary over a wide range, for example, from about 0.3:1 to about 3:1 or about 0.5:1 to about 2.5:1.

The transesterification may be performed in the presence of a solvent, which may be an aromatic, a hydrocarbon, non-polar or polar solvent. Suitable examples are but not limited to benzene, toluene, xylenes, pentane, hexane, heptane, tetrahydrofuran, dioxane (1,2-dioxane and/or 1,3-dioxane and/or 1,4-dioxane), and the like.

An inert gas (e.g., $N_2$) may be passed through the reaction mixture in the reaction zone. The amount of gas passed through the reaction mixture may vary significantly but typically is in the range of from 0.5 to 5 volumes of gas per volume of reaction mixture per hour.

Processes of this disclosure may be carried out in a batch, semi-continuous, or continuous mode.

Lubricating Oil Composition

In one aspect, the present disclosure provides a lubricating oil composition comprising (a) a major amount of an oil of lubricating viscosity and (b) from 0.05 to 15 wt. %, based on the total weight of the lubricating oil composition, of the dispersant composition as described herein.

Oil of Lubricating Viscosity

The lubricating oil compositions disclosed herein generally comprise at least one oil of lubricating viscosity. Any base oil known to a skilled artisan can be used as the oil of lubricating viscosity disclosed herein. Some base oils suitable for preparing the lubricating oil compositions have been described by R. M. Mortier et al. ("*Chemistry and Technology of Lubricants,*" 3rd Edition, London, Springer, 2011, Chapters 1 and 2), A. Sequeria, Jr. ("*Lubricant Base Oil and Wax Processing,*" New York, Marcel Decker, 1994, Chapter 6), and D. V. Brock (*Lubrication Eng.,* 1987, 43, 184-185). Generally, the amount of the base oil in the lubricating oil composition may be from about 70 to about 99.5 wt. %, based on the total weight of the lubricating oil composition. In some embodiments, the amount of the base oil in the lubricating oil composition is from about 75 to about 99 wt. %, from about 80 to about 98.5 wt. %, or from about 80 to about 98 wt. %, based on the total weight of the lubricating oil composition.

In certain embodiments, the base oil is or comprises any natural or synthetic lubricating base oil fraction. Some non-limiting examples of synthetic oils include oils, such as polyalphaolefins or PAOs, prepared from the polymerization of at least one alpha-olefin, such as ethylene; and oils or from hydrocarbon synthesis procedures using carbon monoxide and hydrogen gases, such as the Fisher-Tropsch process. In certain embodiments, the base oil comprises less than about 10 wt. % of one or more heavy fractions, based on the total weight of the base oil. A heavy fraction refers to a lube oil fraction having a kinematic viscosity at 100° C. of at least about 20 $mm^2/s$. In certain embodiments, the heavy fraction has a kinematic viscosity at 100° C. of at least about 25 $mm^2/s$ or at least about 30 $mm^2/s$. In further embodiments, the amount of the one or more heavy fractions in the base oil is less than about 10 wt. %, less than about 5 wt. %, less than about 2.5 wt. %, less than about 1 wt. %, or less than about 0.1 wt. %, based on the total weight of the base oil. In still further embodiments, the base oil comprises no heavy fraction.

In certain embodiments, the lubricating oil compositions comprise a major amount of a base oil of lubricating viscosity. In some embodiments, the base oil has a kinematic viscosity at 100° C. from about 2.5 $mm^2/s$ to about 20 $mm^2/s$. The kinematic viscosity of the base oils or the lubricating oil compositions disclosed herein can be measured according to ASTM D445.

In other embodiments, the base oil is or comprises a base stock or blend of base stocks. In further embodiments, the base stocks are manufactured using a variety of different processes including, but not limited to, distillation, solvent refining, hydrogen processing, oligomerization, esterification, and rerefining. In some embodiments, the base stocks comprise a rerefined stock. In further embodiments, the rerefined stock shall be substantially free from materials introduced through manufacturing, contamination, or previous use.

In some embodiments, the base oil comprises one or more of the base stocks in one or more of Groups I-V as specified in the American Petroleum Institute (API) Publication 1509, Seventeenth Edition, September 2012 (i.e., Appendix E—API Base Oil Interchangeability Guidelines for Passenger Car Motor Oils and Diesel Engine Oils). The API guideline defines a base stock as a lubricant component that may be manufactured using a variety of different processes. Groups I, II and III base stocks are mineral oils, each with specific ranges of the amount of saturates, sulfur content and viscosity index. Group IV base stocks are polyalphaolefins (PAO). Group V base stocks include all other base stocks not included in Group I, II, III, or IV.

The saturates levels, sulfur levels and viscosity indices for Group I, II and III base stocks are listed in Table 1 below.

TABLE 1

| Base Oil Properties | | | |
|---|---|---|---|
| | Saturates[1] | Sulfur[2] | Viscosity Index[3] |
| Group I | <90% and/or | >0.03% and | ≥80 to <120 |
| Group II | ≥90% and | ≤0.03% and | ≥80 to <120 |
| Group III | ≥90% and | ≤0.03% and | ≥120 |

[1]ASTM D2007
[2]ASTM D2270
[3]ASTM D3120, ASTM D4294, or ASTM D4297

In some embodiments, the base oil comprises one or more of the base stocks in Group I, II, III, IV, V or a combination thereof. In other embodiments, the base oil comprises one or more of the base stocks in Group II, III, IV or a combination thereof.

The base oil may be selected from the group consisting of natural oils of lubricating viscosity, synthetic oils of lubricating viscosity and mixtures thereof. In some embodiments, the base oil includes base stocks obtained by isomerization of synthetic wax and slack wax, as well as hydrocrackate base stocks produced by hydrocracking (in addition to or instead of solvent extracting) the aromatic and polar components of the crude. In other embodiments, the base oil of lubricating viscosity includes natural oils, such as animal oils, vegetable oils, mineral oils, oils derived from coal or shale, and combinations thereof. Some non-limiting examples of animal oils include bone oil, lanolin, fish oil, lard oil, dolphin oil, seal oil, shark oil, tallow oil, and whale oil. Some non-limiting examples of vegetable oils include castor oil, olive oil, peanut oil, rapeseed oil, corn oil, sesame oil, cottonseed oil, soybean oil, sunflower oil, safflower oil, hemp oil, linseed oil, tung oil, oiticica oil, jojoba oil, and meadow foam oil. Such oils may be partially or fully hydrogenated. Some non-limiting examples of mineral oils include Groups I, II, and III base stocks, liquid petroleum oils and solvent treated or acid-treated mineral oils of the paraffinic, naphthenic or mixed paraffinic-naphthenic types. In some embodiments, the mineral oils are neat or low viscosity mineral oils.

In some embodiments, the synthetic oils of lubricating viscosity include hydrocarbon oils and halo-substituted hydrocarbon oils such as polymerized and inter-polymerized olefins, alkylbenzenes, polyphenyls, alkylated diphenyl ethers, alkylated diphenyl sulfides, as well as their derivatives, analogues and homologues thereof, and the like. In other embodiments, the synthetic oils include alkylene oxide polymers, interpolymers, copolymers and derivatives thereof wherein the terminal hydroxyl groups can be modified by esterification, etherification, and the like. In further embodiments, the synthetic oils include the esters of dicarboxylic acids with a variety of alcohols. In certain embodiments, the synthetic oils include esters made from $C_5$ to $C_{12}$ monocarboxylic acids and polyols and polyol ethers. In further embodiments, the synthetic oils include tri-alkyl phosphate ester oils, such as tri-n-butyl phosphate and triisobutyl phosphate.

In some embodiments, the synthetic oils of lubricating viscosity include silicon-based oils (such as the polyalkyl-, polyaryl-, polyalkoxy-, polyaryloxy-siloxane oils and silicate oils). In other embodiments, the synthetic oils include liquid esters of phosphorus-containing acids, polymeric tetrahydrofurans, polyalphaolefins, and the like.

Base oil derived from the hydroisomerization of wax may also be used, either alone or in combination with the aforesaid natural and/or synthetic base oil. Such wax isomerate oil is produced by the hydroisomerization of natural or synthetic waxes or mixtures thereof over a hydroisomerization catalyst.

In further embodiments, the base oil comprises a polyalphaolefin (PAO). In general, the polyalphaolefins may be derived from an alpha-olefin having from 2 to about 30, from about 4 to about 20, or from about 6 to about 16 carbon atoms. Non-limiting examples of suitable polyalphaolefins include those derived from octene, decene, mixtures thereof, and the like. These polyalphaolefins may have a kinematic viscosity at 100° C. of from about 2 to about 15 mm$^2$/s, from about 3 to about 12 mm$^2$/s, or from about 4 to about 8 mm$^2$/s. In some instances, the polyalphaolefins may be used together with other base oils such as mineral oils.

In further embodiments, the base oil comprises a polyalkylene glycol or a polyalkylene glycol derivative, where the terminal hydroxyl groups of the polyalkylene glycol may be modified by esterification, etherification, acetylation and the like. Non-limiting examples of suitable polyalkylene glycols include polyethylene glycol, polypropylene glycol, polyisopropylene glycol, and combinations thereof. Non-limiting examples of suitable polyalkylene glycol derivatives include ethers of polyalkylene glycols (e.g., methyl ether of polyisopropylene glycol, diphenyl ether of polyethylene glycol, diethyl ether of polypropylene glycol, etc.), mono- and polycarboxylic esters of polyalkylene glycols, and combinations thereof. In some instances, the polyalkylene glycol or polyalkylene glycol derivative may be used together with other base oils such as poly-alpha-olefins and mineral oils.

In further embodiments, the base oil comprises any of the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, and the like) with a variety of alcohols (e.g., butyl alcohol, hexyl alcohol, dodecyl alcohol, 2-ethylhexyl alcohol, ethylene glycol, diethylene glycol monoether, propylene glycol, and the like). Non-limiting examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the like.

In further embodiments, the base oil comprises a hydrocarbon prepared by the Fischer-Tropsch process. The Fischer-Tropsch process prepares hydrocarbons from gases containing hydrogen and carbon monoxide using a Fischer-Tropsch catalyst. These hydrocarbons may require further processing in order to be useful as base oils. For example, the hydrocarbons may be dewaxed, hydroisomerized, and/or hydrocracked using processes known to a person of ordinary skill in the art.

In further embodiments, the base oil comprises an unrefined oil, a refined oil, a rerefined oil, or a mixture thereof. Unrefined oils are those obtained directly from a natural or synthetic source without further purification treatment. Non-limiting examples of unrefined oils include shale oils obtained directly from retorting operations, petroleum oils obtained directly from primary distillation, and ester oils obtained directly from an esterification process and used without further treatment. Refined oils are similar to the unrefined oils except the former have been further treated by one or more purification processes to improve one or more properties. Many such purification processes are known to those skilled in the art such as solvent extraction, secondary distillation, acid or base extraction, filtration, percolation, and the like. Rerefined oils are obtained by applying to refined oils processes similar to those used to obtain refined oils. Such rerefined oils are also known as reclaimed or reprocessed oils and often are additionally treated by processes directed to removal of spent additives and oil breakdown products.

Other Additives

The lubricating oil compositions of the present disclosure may also contain other conventional additives that can impart or improve any desirable property of the lubricating oil composition in which these additives are dispersed or dissolved. Any additive known to one skilled in the art may be used in the lubricating oil compositions disclosed herein. Some suitable additives have been described by R. M. Mortier et al. ("*Chemistry and Technology of Lubricants*", 2nd Edition, London, Springer, 1996) and L. R. Rudnick ("*Lubricant Additives: Chemistry and Applications*", New York, Marcel Dekker, 2003). For example, the lubricating oil compositions can be blended with antioxidants, anti-wear agents, detergents such as metal detergents, rust inhibitors, dehazing agents, demulsifying agents, metal deactivating agents, friction modifiers, pour point depressants, antifoaming agents, co-solvents, corrosion-inhibitors, ashless dispersants, dyes, extreme pressure agents and the like and mixtures thereof. A variety of the additives are known and commercially available. These additives, or their analogous compounds, can be employed for the preparation of the lubricating oil compositions of the disclosure by the usual blending procedures.

Ashless Dispersants

In addition to the dispersant of the present disclosure, the lubricating oil compositions can contain one or more additional ashless dispersants containing one or more basic nitrogen atoms. The basic nitrogen compound for use herein must contain basic nitrogen as measured, for example, by ASTM D2896 or other equivalent method. The basic nitrogen compounds are selected from the group consisting of succinimides, polysuccinimides, carboxylic acid amides, hydrocarbyl monoamines, hydrocarbon polyamines, Mannich bases, phosphoramides, thiophosphoramides, phosphonamides, dispersant viscosity index improvers, and mixtures thereof. These basic nitrogen-containing compounds are described below (keeping in mind the reservation that each must have at least one basic nitrogen). Any of the nitrogen-containing compositions may be post-treated with, e.g., boron or ethylene carbonate, using procedures well known in the art so long as the compositions continue to contain basic nitrogen.

Another class of nitrogen-containing compositions useful in preparing the dispersants employed in this disclosure includes the so-called dispersant viscosity index improvers (VI improvers). These VI improvers are commonly prepared by functionalizing a hydrocarbon polymer, especially a polymer derived from ethylene and/or propylene, optionally containing additional units derived from one or more co-monomers such as alicyclic or aliphatic olefins or diolefins. The functionalization may be carried out by a variety of processes which introduce a reactive site or sites which usually has at least one oxygen atom on the polymer. The polymer is then contacted with a nitrogen-containing source to introduce nitrogen-containing functional groups on the polymer backbone. Commonly used nitrogen sources include any basic nitrogen compound especially those nitrogen-containing compounds and compositions described herein. Preferred nitrogen sources are alkylene amines, such as ethylene amines, alkyl amines, and Mannich bases.

In one embodiment, the basic nitrogen compounds for use in making the dispersants are succinimides, carboxylic acid amides, and Mannich bases. In another preferred embodiment, the basic nitrogen compounds for use in making the dispersants are succinimides having an average molecular weight of about 1000 or about 1300 or about 2300 and mixtures thereof. Such succinimides can be post treated with boron or ethylene carbonate as known in the art.

Antioxidants

The lubricating oil composition of the can contain one or more antioxidants that can reduce or prevent the oxidation of the base oil. Any antioxidant known by a person of ordinary skill in the art may be used in the lubricating oil composition. Non-limiting examples of suitable antioxidants include amine-based antioxidants (e.g., alkyl diphenylamines such as bis-nonylated diphenylamine, bis-octylated diphenylamine, and octylated/butylated diphenylamine, phenyl-α-naphthylamine, alkyl or arylalkyl substituted phenyl-α-naphthylamine, alkylated p-phenylene diamines, tetramethyl-diaminodiphenylamine and the like), phenolic antioxidants (e.g., 2-tert-butylphenol, 4-methyl-2,6-di-tert-butylphenol, 2,4,6-tri-tert-butylphenol, 2,6-di-tert-butyl-p-cresol, 2,6-di-tert-butylphenol, 4,4'-methylenebis-(2,6-di-tert-butylphenol), 4,4'-thiobis(6-di-tert-butyl-o-cresol) and the like), sulfur-based antioxidants (e.g., dilauryl-3,3'-thiodipropionate, sulfurized phenolic antioxidants and the like), phosphorous-based antioxidants (e.g., phosphites and the like), zinc dithiophosphate, oil-soluble copper compounds and combinations thereof.

Detergents

The lubricating oil composition of the present disclosure can contain a detergent. Metal-containing or ash-forming detergents function as both detergents to reduce or remove deposits and as acid neutralizers or rust inhibitors, thereby reducing wear and corrosion and extending engine life. Detergents generally comprise a polar head with a long hydrophobic tail. The polar head comprises a metal salt of an acidic organic compound. The salts may contain a substantially stoichiometric amount of the metal in which case they are usually described as normal or neutral salts. A large amount of a metal base may be incorporated by reacting excess metal compound (e.g., an oxide or hydroxide) with an acidic gas (e.g., carbon dioxide).

Detergents that may be used include oil-soluble neutral and overbased sulfonates, borated sulfonates, phenates, sulfurized phenates, thiophosphonates, salicylates, and naphthenates and other oil-soluble carboxylates of a metal, particularly the alkali or alkaline earth metals, e.g., barium, sodium, potassium, lithium, calcium, and magnesium. The most commonly used metals are calcium and magnesium, which may both be present in detergents used in a lubricant, and mixtures of calcium and/or magnesium with sodium.

Friction Modifiers

The lubricating oil composition of the present disclosure can contain friction modifiers that can lower the friction between moving parts. Any friction modifier known by a person of ordinary skill in the art may be used in the lubricating oil composition. Non-limiting examples of suitable friction modifiers include fatty carboxylic acids; derivatives (e.g., alcohol, esters, borated esters, amides, metal salts and the like) of fatty carboxylic acid; mono-, di- or tri-alkyl substituted phosphoric acids or phosphonic acids; derivatives (e.g., esters, amides, metal salts and the like) of mono-, di- or tri-alkyl substituted phosphoric acids or phosphonic acids; mono-, di- or tri-alkyl substituted amines; mono- or di-alkyl substituted amides and combinations thereof. In some embodiments examples of friction modifiers include, but are not limited to, alkoxylated fatty amines; borated fatty epoxides; fatty phosphites, fatty epoxides, fatty amines, borated alkoxylated fatty amines, metal salts of fatty acids, fatty acid amides, glycerol esters, borated glycerol esters; and fatty imidazolines as disclosed in U.S. Pat. No. 6,372,696; friction modifiers obtained from a reaction product of a $C_4$ to $C_{75}$, or a $C_6$ to $C_{24}$, or a $C_6$ to $C_{20}$, fatty acid ester and a nitrogen-containing compound selected from the group consisting of ammonia, and an alkanolamine and the like and mixtures thereof.

Antiwear Compounds

The lubricating oil composition of the present disclosure can contain one or more anti-wear agents that can reduce friction and excessive wear. Any anti-wear agent known by a person of ordinary skill in the art may be used in the lubricating oil composition. Non-limiting examples of suitable anti-wear agents include zinc dithiophosphates, metal (e.g., Pb, Sb, Mo and the like) salts of dithiophosphates, metal (e.g., Zn, Pb, Sb, Mo and the like) salts of dithiocarbamates, metal (e.g., Zn, Pb, Sb and the like) salts of fatty acids, boron compounds, phosphate esters, phosphite esters, amine salts of phosphoric acid esters or thiophosphoric acid esters, reaction products of dicyclopentadiene and thiophosphoric acids and combinations thereof.

In certain embodiments, the anti-wear agent is or comprises a dihydrocarbyl dithiophosphate metal salt, such as zinc dialkyl dithiophosphate compounds. The metal of the dihydrocarbyl dithiophosphate metal salt may be an alkali or alkaline earth metal, or aluminum, lead, tin, molybdenum, manganese, nickel or copper. In some embodiments, the metal is zinc. In other embodiments, the alkyl group of the dihydrocarbyl dithiophosphate metal salt has from about 3 to about 22 carbon atoms, from about 3 to about 18 carbon atoms, from about 3 to about 12 carbon atoms, or from about 3 to about 8 carbon atoms. The alkyl group may be linear or branched.

Foam Inhibitors

The lubricating oil composition of the present disclosure can contain one or more foam inhibitors or anti-foam inhibitors that can break up foams in oils. Any foam inhibitor or anti-foam known by a person of ordinary skill in the art may be used in the lubricating oil composition. Non-limiting examples of suitable foam inhibitors or anti-foam inhibitors include silicone oils or polydimethylsiloxanes, fluorosilicones, alkoxylated aliphatic acids, polyethers (e.g., polyethylene glycols), branched polyvinyl ethers, alkyl acrylate polymers, alkyl methacrylate polymers, polyalkoxyamines and combinations thereof. In some embodiments, the foam inhibitors or anti-foam inhibitors comprises glycerol monostearate, polyglycol palmitate, a trialkyl monothiophosphate, an ester of sulfonated ricinoleic acid, benzoylacetone, methyl salicylate, glycerol monooleate, or glycerol dioleate.

Pour Point Depressants

The lubricating oil composition of the present disclosure can contain one or more pour point depressants that can lower the pour point of the lubricating oil composition. Any pour point depressant known by a person of ordinary skill in the art may be used in the lubricating oil composition. Non-limiting examples of suitable pour point depressants include polymethacrylates, alkyl acrylate polymers, alkyl methacrylate polymers, di(tetra-paraffin phenol)phthalate, condensates of tetra-paraffin phenol, condensates of a chlorinated paraffin with naphthalene and combinations thereof. In some embodiments, the pour point depressant comprises an ethylene-vinyl acetate copolymer, a condensate of chlorinated paraffin and phenol, polyalkyl styrene or the like.

Demulsifiers

The lubricating oil composition of the present disclosure can contain one or more demulsifiers that can promote oil-water separation in lubricating oil compositions that are exposed to water or steam. Any demulsifier known by a person of ordinary skill in the art may be used in the lubricating oil composition. Non-limiting examples of suitable demulsifiers include anionic surfactants (e.g., alkyl-naphthalene sulfonates, alkyl benzene sulfonates and the like), nonionic alkoxylated alkyl phenol resins, polymers of alkylene oxides (e.g., polyethylene oxide, polypropylene oxide, block copolymers of ethylene oxide, propylene oxide and the like), esters of oil soluble acids, polyoxyethylene sorbitan ester and combinations thereof.

Corrosion Inhibitors

The lubricating oil composition of the present disclosure can contain one or more corrosion inhibitors that can reduce corrosion. Any corrosion inhibitor known by a person of ordinary skill in the art may be used in the lubricating oil composition. Non-limiting examples of suitable corrosion inhibitor include half esters or amides of dodecylsuccinic acid, phosphate esters, thiophosphates, alkyl imidazolines, sarcosines and combinations thereof.

Extreme Pressure Agents

The lubricating oil composition of the present disclosure can contain one or more extreme pressure (EP) agents that can prevent sliding metal surfaces from seizing under conditions of extreme pressure. Any extreme pressure agent known by a person of ordinary skill in the art may be used in the lubricating oil composition. Generally, the extreme pressure agent is a compound that can combine chemically with a metal to form a surface film that prevents the welding of asperities in opposing metal surfaces under high loads. Non-limiting examples of suitable extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, amine salts of phosphoric acid esters or thiophosphoric acid esters and combinations thereof.

Rust Inhibitors

The lubricating oil composition of the present disclosure can contain one or more rust inhibitors that can inhibit the corrosion of ferrous metal surfaces. Any rust inhibitor known by a person of ordinary skill in the art may be used in the lubricating oil composition. Non-limiting examples of suitable rust inhibitors include nonionic polyoxyalkylene agents, e.g., polyoxyethylene lauryl ether, polyoxyethylene higher alcohol ether, polyoxyethylene nonylphenyl ether, polyoxyethylene octylphenyl ether, polyoxyethylene octyl stearyl ether, polyoxyethylene oleyl ether, polyoxyethylene sorbitol monostearate, polyoxyethylene sorbitol monooleate, and polyethylene glycol monooleate; stearic acid and other fatty acids; dicarboxylic acids; metal soaps; fatty acid amine salts; metal salts of heavy sulfonic acid; partial carboxylic acid ester of polyhydric alcohol; phosphoric esters; (short-chain) alkenyl succinic acids; partial esters thereof and nitrogen-containing derivatives thereof; synthetic alkarylsulfonates, e.g., metal dinonylnaphthalene sulfonates; and the like and mixtures thereof.

Multifunctional Additives

The lubricating oil composition of the present disclosure can contain one or more multifunctional additives. Non-limiting examples of suitable multifunctional additives include sulfurized oxymolybdenum dithiocarbamate, sulfurized oxymolybdenum organophosphorodithioate, oxymolybdenum monoglyceride, oxymolybdenum diethylate amide, amine-molybdenum complex compound, and sulfur-containing molybdenum complex compound.

Viscosity Index Improvers

The lubricating oil composition of the present disclosure can contain one or more viscosity index improvers. Non-limiting examples of suitable viscosity index improvers include, but are not limited to, olefin copolymers, such as ethylene-propylene copolymers, styrene-isoprene copolymers, hydrated styrene-isoprene copolymers, polybutene, polyisobutylene, polymethacrylates, vinylpyrrolidone and methacrylate copolymers and dispersant type viscosity index improvers. These viscosity modifiers can optionally be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers). Other examples of viscosity modifiers include star polymers (e.g., a star polymer comprising isoprene/styrene/isoprene triblock). Yet other examples of viscosity modifiers include poly alkyl(meth)acrylates of low Brookfield viscosity and high shear stability, functionalized poly alkyl(meth)acrylates with dispersant properties of high Brookfield viscosity and high shear stability, polyisobutylene having a weight average molecular weight ranging from 700 to 2,500 Daltons and mixtures thereof.

Metal Deactivators

The lubricating oil composition of the present disclosure can contain one or more metal deactivators. Non-limiting examples of suitable metal deactivators include disalicylidene propylenediamine, triazole derivatives, thiadiazole derivatives, and mercaptobenzimidazoles.

Each of the foregoing additives, when used, is used at a functionally effective amount to impart the desired properties to the lubricant. Thus, for example, if an additive is a friction modifier, a functionally effective amount of this friction modifier would be an amount sufficient to impart the desired friction modifying characteristics to the lubricant. Generally, the concentration of each of these additives, when used, may range, unless otherwise specified, from about 0.001 wt. % to about 10 wt. %, in one embodiment from about 0.005 wt. % to about 5 wt. %, or in one embodiment from about 0.1 wt. % to about 2.5 wt. %, based on the total weight of the lubricating oil composition. Further, the total amount of the additives in the lubricating oil composition may range from about 0.001 wt. % to about 20 wt. %, from about 0.01 wt. % to about 10 wt. %, or from about 0.1 wt. % to about 5 wt. %, based on the total weight of the lubricating oil composition.

Lubricating Oil Additive Concentrate

The dispersant composition described herein may be provided as an additive package or concentrate in which the dispersant composition is incorporated into a substantially inert, normally liquid organic diluent such as mineral oil to form an additive concentrate. Typically, a neutral oil having a kinematic viscosity of 4 to 8.5 mm$^2$/s at 100° C. (e.g., 4 to 6 mm$^2$/s at 100° C.) will be used as the diluent, though synthetic oils, as well as other organic liquids which are compatible with the additive and finished lubricating oil can also be used.

Typically, the concentrates contain sufficient diluent to make them easy to handle during shipping and storage. These concentrates usually include from 80 to 20 wt. % of an organic liquid diluent and from 20 to 80 wt. % of the dispersant composition described herein.

EXAMPLES

The following examples are intended for illustrative purposes only and do not limit in any way the scope of the present disclosure.

Example 1

Preparation of 3-(Phenylamino)propanoic Acid Methyl Ester (CAS No. 21911-84-2)

To a round-bottom flask containing a stir bar under nitrogen was added aniline (13.96 g, 0.15 mol) and 1,2-dichloroethane (150 mL). To this solution was then added aluminum chloride on silica (6.7 g, 11 mmol, 1.67 mmol/g) and methyl acrylate (19.4g, 0.225 mol). The reaction mixture was then heated to 60° C. for 4 hours using a pre-heated aluminum tray equipped with a thermocouple under nitrogen. The reaction mixture was then filtered and the mother liquor washed with water (twice), brine, dried (MgSO$_4$), filtered and concentrated under reduced pressure to afford a yellow solid (25.4 g, 94% yield). Product contained approximately 17% 3-[(3-methoxy-3 oxopropyl)phenylamino] dipropanoic acid dimethyl ester (CAS No. 53733-94-1). $^1$H NMR (400 MHz, CDCl$_3$, ppm): δ 2.61 (t, J=6.38 Hz, 2 H), 3.45 (t, J=6.36 Hz, 2H), 3.69 (s,3H), 4.00 (br. s, 1H), 6.61 (m, 2H), 6.71 (m, 1H), 7.17 (m, 2H). $^{13}$C NMR (100 MHz, CDCl$_3$): δ 173.0, 147.7, 129.5, 117.9, 113.2, 51.9, 39.5, 33.8. FTIR (cm$^{-1}$): ν (N—H)st 3397, ν (C—H)st 2951, ν (C=O)st 1727, (C—H) ν,oop 747, 692.

Example 2

Preparation of Methyl 3-(Ethylanilino) Acid Methyl Ester (CAS No. 21608-06-0)

To a round-bottom flask containing a stir bar under nitrogen was added N-ethylaniline (25 g, 0.21 mol) and methyl acrylate (26.6 g, 0.31 mol). To this solution was then added aluminum chloride on silica (9.25 g, 15.45 mmol, 1.67 mmol/g). The reaction mixture was then heated to 80° C. for 12 hours using a pre-heated aluminum tray equipped with a thermocouple under nitrogen. The reaction mixture was diluted with 5% ethyl acetate:hexanes passed through a pad of silica (4"×0.5") and concentrated under reduced pressure to afford an orange oil (30 g, 70% yield). $^1$H NMR (400 MHz, CDCl$_3$, ppm) δ 7.22 (dd, J=9.0, 7.1 Hz, 2H), 6.72-6.65 (m, 3H), 3.69 (s, 3H), 3.66-3.59 (m, 2H), 3.37 (q, J=7.1 Hz, 2H), 2.67-2.54 (m, 2H), 1.15 (t, J=7.1 Hz, 3H). $^{13}$C NMR (100 MHz, CDCl$_3$): δ 172.65, 147.24, 129.37, 116.25, 112.22, 51.71, 46.21, 45.07, 32.46, 12.38. FTIR (cm$^{-1}$): ν (N—H)st 3397, ν (C—H)st 2951, ν (C=O)st 1732, (C—H) ν,oop 744, 692; Elemental. Anal. (%) Calc. C, 69.54; H, 8.27; N, 6.76; Exp. C, 69.74; H, 8.00; N, 6.64.

Example 3

Preparation of 3-(4-Phenylamino-phenylamino)propanoic Acid Methyl Ester (CAS No. 491874-00-1)

To a round-bottom flask containing a stir bar and a reflux condenser under nitrogen was added N-phenyl-1,4-phenylenediamine (36.8 g, 0.2 mol), followed by the addition of methyl acrylate (34.4 g, 0.4 mol) slowly via syringe. The resulting reaction mixture stirred for 5 minutes whereupon silica-supported aluminum chloride silica (9 g, 15 mmol, 1.67 mmol/g) was added. The reaction mixture was then heated to 80° C. for 6 hours using a pre-heated aluminum tray equipped with a thermocouple under nitrogen. The reaction mixture was then diluted with ethyl acetate, filtered and the mother liquor collected, washed with water, brine, dried (Na$_2$SO$_4$), filtered and concentrated under reduced pressure to afford a dark oil (50 g, 92% yield) which slowly crystallized upon standing. The product contained approximately 33% 3-(4-phenylamino-phenylamino) dipropanoic acid dimethyl ester; alt. name: dimethyl 3,3'-(4-phenylamino phenyl)azanediyl)dipropanoate. $^1$H NMR (400 MHz, CDCl$_3$, ppm): δ 2.64 (t, J=6.34 Hz, 2H), 3.61 (t, J=7.16 Hz, 2H), 3.71 (s, 3H), 6.62 (d, J=8.52 Hz, 2H), 6.78 (t, J=7.64 Hz, 1H), 6.84 (d, J=7.88 Hz, 2H), 7.01 (d, J=8.52 Hz, 2H), 7.18 (m, 2H). $^{13}$C NMR (100 MHz, CDCl$_3$): δ 173.0, 143.8, 133.3, 129.4, 123.8, 123.1, 119.0, 115.1, 114.2, 51.9, 40.2, 33.9. FTIR (cm$^{-1}$): ν (N—H)st 3383, ν (C—H)st 2950, ν (C=O)st 1723, (C—H) ν,oop 746, 693.

Example 4

Preparation of 1-Piperazinepropanoic Acid 4-Phenyl-Methyl Ester (CAS No. 339556-29-5)

To a round-bottom flask containing a stir bar was added phenylpiperazine (10 g, 61.6 mmol), followed by the slow addition of methyl acrylate (7.96 g, 92.4 mmol) via syringe at room temperature. The resulting pale yellow solution was allowed to stir for at room temperature for 23 hours. Volatiles were then removed under reduced pressure to afford a yellow oil (15.2 g, 99% yield) which crystallizes at room temperature. $^1$H NMR (400 MHz, CDCl$_3$, ppm): δ 2.55 (t, J=7.36 Hz, 2H), 2.63 (t, J=5.02 Hz, 4H), 2.76 (t, J=4.98 Hz, 2H), 3.19 (t, J=5.04 Hz, 4H), 3.69 (s, 3H), 6.85 (m, 1H), 6.92 (m, 2H), 7.26 (q, J=5.35 Hz, 2H). $^{13}$C NMR (100 MHz, CDCl$_3$): δ 173.0, 151.4, 129.2, 119.9, 116.2, 53.7, 53.1, 51.8, 49.3, 32.3. FTIR (cm$^{-1}$): ν (C—H)st 2947, ν (C—H)st 2817, ν (C=O)st 1733, (C—H) ν,oop 756, 690. Elemental. Anal. (%) Calc. C, 67.71; H, 8.12; N, 11.28; Exp. C, 67.93; H, 8.16; N, 11.24.

Example 5

Preparation of Dimethyl 2-((4-Phenylpiperazin-1-yl)methyl)succinate

To a round-bottom flask containing a stir bar under nitrogen was added phenyl piperazine (7 g, 0.043 mol) followed by the addition of dimethyl itaconate (7.14 g, 0.045 mol) at room temperature. The resulting reaction mixture was allowed to stir for 18 hours at room temperature under nitrogen. The volatiles were then removed to afford a pale yellow crystalline (13.9 g, 100% yield). $^1$H NMR (400 MHz, CDCl$_3$, ppm): δ 7.29-7.22 (m, 2H), 6.94-6.88 (m, 2H), 6.85 (tt, J=7.2, 1.1 Hz, 1H), 3.71 (s, 3H), 3.68 (s, 3H), 3.14 (t, J=5.0 Hz, 5H), 2.77-2.54 (m, 7H), 2.49 (dd, J=12.3, 8.9 Hz, 1H). $^{13}$C NMR (100 MHz, CDCl$_3$): δ 174.5, 172.5, 151.3, 129.1, 119.7, 116.0, 59.4, 53.2, 52.0, 51.8, 49.2, 39.7. 34.4. FTIR (cm$^{-1}$): ν (C—H)st 2954, ν (C—H)st 2814, ν (C=O) st 1725, (C—H) ν,oop 840, 766, 694.

Example 6

Preparation of 4-Morpholinepropanoic Acid Methyl Ester (CAS No. 33611-43-7)

To a round-bottom flask containing a stir bar under nitrogen was added morpholine (21.8 g, 0.25 mol) and methyl acrylate (32.3 g, 0.375 mol). The resulting reaction mixture was allowed to stir at room temperature for 5 hours. Mixture was then diluted with ethyl acetate and the organic solution washed with brine (twice), dried (MgSO$_4$), filtered and concentrated under reduced pressure to afford a colorless oil (28.7 g, 66% yield). $^1$H NMR (400 MHz, CDCl$_3$, ppm): δ 2.44 (t, J=4.48 Hz, 4H), 2.49 (t, J=7.32 Hz, 2H), 2.67 (t, J=4.85 Hz, 2H), 3.68 (m, 7H). $^{13}$C NMR (100 MHz, CDCl$_3$): δ 172.9, 67.0, 54.0, 53.4, 51.7, 31.9. FTIR (cm$^{-1}$): ν (C—H)st 2952, ν (C—H)st 2853, ν (C—H)st 2810, ν (C=O)st 1734, (C—H) ν,oop 772, 619. Elemental. Anal. (%) Calc. C, 55.47; H, 8.73; N, 8.09; Exp. C, 53.97; H, 8.76; N, 7.63.

Example 7

Preparation of 4-Morpholinepropanoic Acid, α-Methyl-, Methyl Ester (CAS No. 20120-26-7)

To a round-bottom flask containing a stir bar under nitrogen was added methyl methacrylate (34.5 g, 0.34 mol) followed by the addition of morpholine (20 g, 0.23 mol) via pipette over 2 minutes at room temperature. The resulting reaction mixture was allowed to stir at room temperature for 10 minutes, then heated to 80° C. using an aluminum tray equipped with a thermocouple under nitrogen. The reaction mixture was then cooled to room temperature and stirred for 16 hours whereupon it was re-heated to 80° C. for 4 additional hours, then cooled again to room temperature. Volatiles were then removed under reduced pressure to afford a light yellow viscous oil (21.6 g, 50% yield). $^1$H NMR (400 MHz, CDCl$_3$, ppm): δ 1.14 (d, J=6.76 Hz, 3H), 2.29 (q, J=5.88 Hz, 1H), 2.42 (m, 4H), 2.66 (m, 2H), 3.65 (t, J=4.66 Hz, 4H), 3.68 (s, 3H). $^{13}$C NMR (100 MHz, CDCl$_3$): δ 176.5, 67.2, 62.1, 53.8, 51.7, 37.7, 15.6. FTIR (cm$^{-1}$): ν (C—H)st 2951, ν (C—H)st 2852, ν (C—H)st 2809, ν (C=O)st 1729, (C—H) ν,oop 799, 749, 628.

Example 8

Preparation of 4-Morpholinepropanoic Acid, β-Methyl-, Methyl Ester (CAS No. 33611-45-9)

To a round-bottom flask containing a stir bar under nitrogen was added trans-methyl crotonate (34.5 g, 0.34 mol) followed by the addition of morpholine (20 g, 0.23 mol) via pipette over 2 minutes at room temperature. The resulting reaction mixture was allowed to stir at room temperature for 10 minutes, then heated to 80° C. using an aluminum tray equipped with a thermocouple under nitrogen for 6 hours. The reaction mixture was then cooled to room temperature. Volatiles were then removed under reduced pressure to afford a light yellow viscous oil (16.8 g, 39% yield). $^1$H NMR (400 MHz, CDCl$_3$, ppm): δ 1.00 (d, J=6.64 Hz, 3H), 2.19 (q, J=7.43 Hz, 1H), 2.47 (m, 5H), 3.04 (m, 1H), 3.60 (m, 7H). $^{13}$C NMR (100 MHz, CDCl$_3$): δ 172.9, 67.4, 56.7, 51.6, 48.7, 38.2, 14.8. FTIR (cm$^{-1}$): ν (C—H)st 2954, ν (C—H)st 2853, ν (C—H)st 2814, ν (C=O)st 1734, (C—H) ν,oop 851, 754, 630.

Example 9

Preparation of 1H-Indole-1-Propanoic Acid, 2,3-Dihydro-, Methyl Ester (CAS No. 600167-46-2)

To a round-bottom flask containing a stir bar under nitrogen was added indoline (10 g, 0.084 mol) followed by the addition of methyl acrylate (10.8 g, 0.126 mol) via syringe at room temperature. The mixture was allowed to stir at room temperature for 5 minutes, whereupon aluminum chloride on silica (3.77 g, 6.3 mmol, 1.67 mmol/g) was added and resulting mixture allowed to stir 10 additional minutes at room temperature. The reaction mixture was then heated to 60° C. for 4 hours using a pre-heated aluminum tray equipped with a thermocouple under nitrogen. The reaction mixture was allowed to cool to room temperature, diluted with ethyl acetate, filtered thru a silica pad (4"× 0.75") eluted with additional ethyl acetate. Solution concentrated under reduced pressure to afford a purple oil (14.66 g, 85% yield). $^1$H NMR (400 MHz, CDCl$_3$, ppm): δ 7.12-7.05 (m, 2H), 6.68 (td, J=7.4, 1.0 Hz, 1H), 6.53 (dd, J=8.1, 0.9 Hz, 1H), 3.71 (s, 3H), 3.44 (t, J=7.1 Hz, 2H), 3.37 (t, J=8.3 Hz, 2H), 2.97 (t, J=8.3 Hz, 2H), 2.63 (t, J=7.1 Hz, 2H). $^{13}$C NMR (100 MHz, CDCl$_3$): δ 172.8, 151.9, 130.0, 127.4, 124.6, 117.9, 107.1, 53.2, 51.9, 45.2, 32.4, 28.7. FTIR (cm$^{-1}$): ν (C—H)st 2949, ν (C—H)st 2841, ν (C=O)st 1732, (C—H) ν,oop 866, 836, 742; Elemental. Anal. (%) Calc. C, 70.22; H, 7.37; N, 6.82; Exp. C, 70.4; H, 6.81; N, 6.37.

Example 10

Preparation of Carbazole-9-Propionic Acid Methyl Ester (CAS No. 88107-73-7)

To a round-bottom flask containing a stir bar was added carbazole (10.03 g, 60 mmol) and dimethylformamide (60 mL). The resulting mixture was stirred at room temperature until it becomes homogenous. To this solution was then added methyl acrylate (7.74 g, 90 mmol) and potassium carbonate (9.12 g, 66 mmol). The resulting reaction mixture was stirred for 7 hours at room temperature. The solution was then filtered and the mother liquor collected and concentrated under reduced pressure to afford a brown viscous oil. The oil was then purified by flash chromatography using 0-40% ethyl acetate:hexanes gradient. Product fractions were combined and concentrated under reduced pressure to colorless oil (7.9 g, 52% yield) which crystallized at room temperature. $^1$H NMR (400 MHz, CD$_2$Cl$_2$, ppm): δ 2.87 (t, J=7.08 Hz, 2H), 3.61 (s, 3H), 4.66 (t, J=7.06 Hz, 2H), 7.25 (m, J=3.98 Hz, 2H), 7.49 (d, J=3.64 Hz, 4H), 8.10 (d, J=7.76 Hz, 2H). $^{13}$C NMR (100 MHz, CD$_2$Cl$_2$): 172.1, 140.5, 126.2, 123.4, 120.7, 119.5, 109.2, 52.1, 39.2, 33.7. FTIR (cm$^{-1}$): ν (C—H)st 2959, ν (C=O)st 1730, (C—H)δ,oop 747, 721, 709, 676. Elemental. Anal. (%) Calc. C, 75.87; H, 5.97; N, 5.53; Exp. C, 75.80; H, 5.95; N, 5.46.

Example 11

Preparation of Methyl 3-(10H-Phenothiazin-10-yl)propionic acid Methyl Ester (CAS No. 362-04-9)

To an oven dried Schlenk round-bottom flask containing a stir bar under nitrogen was added potassium carbonate (7.6 g, 0.055 mol), phenothiazine (10 g, 0.050 mol) and dimethylformamide (50 mL) at room temperature. To this solution was then added methyl acrylate (6.46 g, 6.79 mL, 0.075 mol) via syringe. The resulting reaction mixture was stirred for 42 hours at 60° C. using a pre-heated aluminum tray equipped with a thermocouple under nitrogen. The solution was then cooled and filtered and the solids washed with ethyl acetate (20 mL). The mother liquor was then concentrated under reduced pressure to a brown viscous oil. To this oil was added toluene (20 mL) and mixture stirred briefly. The resulting insoluble fraction was removed by filtration. The combined mother liquor fractions were then loaded on to a silica gel column and purified by flash chromatography using 0-10% ethyl acetate:hexanes as an eluent. Product fractions were combined and concentrated under reduced pressure to provide a colorless oil (3.2 g, 22% yield) which crystallized upon storage at room temperature. $^1$H NMR (400 MHz, CD$_2$Cl$_2$, ppm): δ 7.19-7.11 (m, 4H), 6.93 (td, J=7.5, 1.2 Hz, 2H), 6.88 (dd, J=8.1, 1.1 Hz, 2H), 4.21 (t, J=7.4 Hz, 2H), 3.70 (s, 3H), 2.84 (t, J=7.6 Hz, 2H). $^{13}$C NMR (100 MHz, CD$_2$Cl$_2$): δ 172.0, 144.7, 127.6, 127.3, 125.3, 122.8, 115.2, 77.3, 77.0, 76.7, 51.9, 42.9, 32.4. FTIR (cm$^{-1}$): ν (C—H)st 3060, 2996, 2948, ν (C=O)st 1730, (C—H) ν,oop 744, 728, 694.

Example 12

Preparation of 1H-Imidazole-1-Propanoic Acid Methyl Ester (CAS No. 18999-46-7)

To a round-bottom flask containing a stir bar under nitrogen was added imidazole (5.0 g, 73.4 mmol), cesium carbonate (4.0 g, 12.2 mmol), and tetrahydrofuran (20 mL). To this solution was added methyl acrylate (6.9 g, 80.7 mmol) via syringe. The reaction mixture was stirred for 8 hours at room temperature, then filtered to remove the solids. The crude reaction mixture was concentrated under reduced pressure to yield a viscous yellow oil (11.1 g, 98% yield). $^1$H NMR (400 MHz, CD$_2$Cl$_2$, ppm): δ 2.75 (t, J=6.7 Hz, 2H), 3.65 (s, 3H), 4.22 (t, J=6.7 Hz, 3H), 6.92 (s, 1H), 6.94 (s, 1H), 7.43 (s, 1H). $^{13}$C NMR (100 MHz, CDCl$_3$): δ 170.9, 137.2, 129.6, 118.8, 52.0, 42.2, 35.7.

Example 13

Preparation of 1H-Benzimidazole-1-Propanoic Acid Methyl Ester (CAS No. 144186-69-6)

To a round-bottom flask containing a stir bar under nitrogen was added benzimidazole (5.0 g, 42.3 mmol), cesium carbonate (2.3 g, 7.1 mmol), and tetrahydrofuran (20 mL). To this solution was added methyl acrylate (4.0 g, 46.5 mmol) via syringe. The reaction mixture was stirred for 8 hours at room temperature, then filtered to remove the solids. The crude reaction mixture was concentrated under reduced pressure to yield a viscous brown oil (8.5 g, 99% yield). $^1$H NMR (400 MHz, CD$_2$Cl$_2$, ppm): δ 2.86 (t, J=6.4 Hz, 2H), 3.63 (s, 3H), 4.47 (t, J=6.4 Hz, 3H), 7.22-7.31 (m, 2H), 7.41 (d, J=7.4 Hz 1H), 7.71 (d, J=7.4 Hz 1H), 7.91 (s, 1H). $^{13}$C NMR (100 MHz, CDCl$_3$): δ 170.0, 143.9, 143.3, 133.4, 123.1, 122.3, 120.6, 109.3, 52.1, 40.3, 34.2.

Example 14

Michael Adduct of EC Treated PIB Succinimide Dispersant with 0.3 eq. Carbazole-9-Propionic Acid Methyl Ester To a 4-neck round-bottom flask was added an ethylene carbonate post-treated 2300 MW PIB succinimide (99.3 g) (nitrogen content=1.05 wt. %) prepared from Ethyleneamine E-100 (nitrogen content=33.7%; M$_n$=250-300 g/mole). The round-bottom flask was then equipped with an overhead stirrer, thermocouple and nitrogen inlet. Carbazole-9-propionic acid methyl ester (0.86 g, 3.4 mmol, 0.3 eq. of succinimide), prepared by a scaled-up method of that described in Example 10, was added in a single portion at room temperature under nitrogen. To this reaction mixture was then added dibutyltin dilaurate (1.0 g, 0.0016 mol) via syringe and reaction mixture heated to 150° C. for 5 hours. The reaction mixture was then cooled to room temperature.

Example 15

Michael Adduct of EC Treated PIB Succinimide Dispersant with 0.7 eq. Carbazole-9-Propionic Acid Methyl Ester To a 4-neck round-bottom flask was added an ethylene carbonate post-treated 2300 MW PIB succinimide (200 g) (nitrogen content=1.05 wt. %) prepared from Ethyleneamine E-100 (nitrogen content=33.7%; M$_n$=250-300 g/mole). The round-bottom flask was then equipped with an overhead stirrer, thermocouple and nitrogen inlet. Carbazole-9-propionic acid methyl ester (4.35 g, 0.017 mol, 0.7 eq. of succinimide), prepared by a scaled-up method of that described in Example 10, was added in a single portion at room temperature under nitrogen. To this reaction mixture was then added titanium isopropoxide (1.2 g, 0.0042 mol) via syringe and reaction mixture heated to 150° C. for 10-12 hours. The reaction mixture was then cooled to room temperature.

Example 16

Michael Adduct of EC Treated PIB Succinimide Dispersant with 1.5 eq. Carbazole-9-Propionic Acid Methyl Ester To a 4-neck round-bottom flask was added an ethylene carbonate post-treated 2300 MW PIB succinimide (477.4 g) (nitrogen content=1.01 wt. %) prepared from Ethyleneamine E-100 (nitrogen content=33.7%; $M_n$=250-300 g/mole). The round-bottom flask was then equipped with an overhead stirrer, thermocouple and nitrogen inlet. Carbazole-9-propionic acid methyl ester (20 g, 0.079 mol, 1.5 eq. of succinimide), prepared by a scaled-up method of that described in Example 10, was added in a single portion at room temperature under nitrogen. To this reaction mixture was then added titanium isopropoxide (2.86 g, 0.01 mol) via syringe and reaction mixture heated to 150° C. for 10-12 hours. The reaction mixture was then cooled to room temperature.

Example 17

Michael Adduct of EC Treated PIB Succinimide Dispersant with 2.3 eq. Carbazole-9-Propionic Acid Methyl Ester To a 4-neck round-bottom flask was added an ethylene carbonate post-treated 2300 MW PIB succinimide (208 g) (nitrogen content=1.05 wt. %) prepared from Ethyleneamine E-100 (nitrogen content=33.7%; $M_n$=250-300 g/mole). The round-bottom flask was then equipped with an overhead stirrer, thermocouple and nitrogen inlet. Carbazole-9-propionic acid methyl ester (13.6 g, 0.054 mol, 2.3 eq. of succinimide), prepared by a scaled-up method of that described in Example 10, was added in a single portion at room temperature under nitrogen. To this reaction mixture was then added titanium isopropoxide (1.25 g, 0.0044 mol) via syringe and reaction mixture heated to 150° C. for 10-12 hours. The reaction mixture was then cooled to room temperature.

Example 18

Michael Adduct of EC Treated PIB Succinimide Dispersant with 3.0 eq. Carbazole-9-Propionic Acid Methyl Ester To a 4-neck round-bottom flask was added an ethylene carbonate post-treated 2300 MW PIB succinimide (294 g) (nitrogen content=1.05 wt. %) prepared from Ethyleneamine E-100 (nitrogen content=33.7%; $M_n$=250-300 g/mole). The round-bottom flask was then equipped with an overhead stirrer, thermocouple and nitrogen inlet. Carbazole-9-propionic acid methyl ester (25.6 g, 0.1 mol, 3.0 eq. of succinimide), prepared by a scaled-up method of that described in Example 10, was added in a single portion at room temperature under nitrogen. To this reaction mixture was then added dibutyltin dilaurate (1.6 g, 0.0025 mol) via syringe and reaction mixture heated to 160° C. for 10-12 hours. The reaction mixture was then cooled to room temperature.

Example 19

Michael Adduct of EC Treated PIB Succinimide Dispersant with 0.7 eq. 1H-Indole-1-Propanoic Acid, 2,3-Dihydro-, Methyl Ester This dispersant was prepared by transesterification as described in Example 15 using 1H-indole-1-propanoic acid, 2,3-dihydro-, methyl ester, prepared by a scaled-up method of that described in Example 9.

Example 20

Michael Adduct of EC Treated PIB Succinimide Dispersant with 1.5 eq. 1H-Indole-1-Propanoic Acid, 2,3-Dihydro-, Methyl Ester This dispersant was prepared by transesterification as described in Example 16 using 1H-indole-1-propanoic acid, 2,3-dihydro-, methyl ester, prepared by a scaled-up method of that described in Example 9.

Example 21

Michael Adduct of EC Treated PIB Succinimide Dispersant with 2.3 eq. 1H-Indole-1-Propanoic Acid, 2,3-Dihydro-, Methyl Ester This dispersant was prepared by trans-esterification as described in Example 17 using 1H-indole-1-propanoic acid, 2,3-dihydro-, methyl ester, prepared by a scaled-up method of that described in Example 9.

Example 22

Michael Adduct of EC Treated PIB Succinimide Dispersant with 1.5 eq. 3-(Phenylamino)propanoic Acid Methyl Ester This dispersant was prepared by trans-esterification as described in Example 16 using 3-(phenylamino)propanoic acid methyl ester, prepared by a scaled-up method of that described in Example 1.

Example 23

Michael Adduct of EC Treated PIB Succinimide Dispersant with 1.5 eq. Methyl 3-(Ethylanilino) Acid Methyl Ester This dispersant was prepared by transesterification as described in Example 16 using methyl 3-(ethylanilino) acid methyl ester prepared by a scaled-up method of that described in Example 2.

Example 24

Michael Adduct of EC Treated PIB Succinimide Dispersant with 1.5 eq. 3-(4-Phenylamino-phenylamino)propanoic Acid Methyl Ester This dispersant was prepared by transesterification as described in Example 16 using 3-(4-phenylamino-phenylamino)propanoic acid methyl ester prepared by a scaled-up method of that described in Example 3.

Example 25

Michael Adduct of EC Treated PIB Succinimide Dispersant with 1.5 eq. 1-Piperazinepropanoic acid 4-Phenyl-Methyl Ester This dispersant was prepared by transesterification as described in Example 16 using 1-piperazinepropanoic acid 4-phenyl-methyl ester prepared by a scaled-up method of that described in Example 4.

Example 26

Michael Adduct of EC Treated PIB Succinimide Dispersant with 1.5 eq. 4-Morpholinepropanoic Acid Methyl Ester This dispersant was prepared by transesterification as described in Example 16 using 4-morpholinepropanoic acid methyl ester prepared by a scaled-up method of that described in Example 6.

Example 27

Michael Adduct of EC Treated PIB Succinimide Dispersant with 1.5 eq. Methyl 2-Methyl-3-Morpholinopropanoate This dispersant was prepared by transesterification as described in Example 16 using methyl 2-methyl-3-morpholinopropanoate prepared by a scaled-up method of that described in Example 7.

Example 28

Michael Adduct of EC Treated PIB Succinimide Dispersant with 1.5 eq. Methyl Methyl 3-Morpholinobutanoate This dispersant was prepared by transesterification as described in Example 16 using methyl methyl 3-morpholinobutanoate prepared by a scaled-up method of that described in Example 8.

Example 29

Michael Adduct of EC Treated PIB Succinimide Dispersant with 1.5 eq. Methyl 3-(10H-Phenothiazin-10-yl)propionic Acid Methyl Ester This dispersant was prepared by transesterification following procedure described in Example 16 using 3-(10H-phenothiazin-10-yl)propionic acid methyl ester prepared by a scaled-up method of that described in Example 11.

Example 30

Michael Adduct of EC Treated PIB Succinimide Dispersant with 1.5 eq. 1H-Imidazole-1-Propanoic Acid Methyl Ester This dispersant was prepared by transesterification following procedure described in Example 16 using 1H-imidazole-1-propanoic acid methyl ester prepared by a scaled-up method of that described in Example 12.

Example 31

Michael Adduct of EC Treated PIB Succinimide Dispersant with 1.5 eq. 1H-Benzimidazole-1-Propanoic Acid Methyl Ester This dispersant was prepared by transesterification following procedure described in Example 16 using 1H-benzimidazole-1-propanoic acid methyl ester prepared by a scaled-up method of that described in Example 13.

Example 32

EC Treated PIB Succinimide Dispersant with 1.5 eq. Methyl Nicotinate

This dispersant was prepared by transesterification following procedure described in Example 16 using methyl nicotinate.

Example 33

EC Treated PIB Succinimide Dispersant with 1.5 eq. Methyl Quinoline-2-Carboxylate This dispersant was prepared by transesterification following procedure described in Example 16 using methyl quinoline-2-carboxylate.

Example 34

EC Treated PIB Succinimide Dispersant with 1.5 eq. 2-Pyrazine-Carboxylate

This dispersant was prepared by transesterification following procedure described in Example 16 using methyl 2-pyrazinecarboxylate.

Example 35

EC Treated PIB Succinimide Dispersant with 1.5 eq. Methyl Indole-2-Carboxylate This dispersant was prepared by transesterification following procedure described in Example 16 using methyl indole-2-carboxylate.

Example 36

EC Treated PIB Succinimide Dispersant with 1.5 eq. Methyl Salicylate

An ethylene carbonate post-treated 2300 MW PIB succinimide (270.62 g, nitrogen content=1.01%) prepared from Ethyleneamine E-100 (nitrogen content=33.7%; $M_n$=250-300 g/mole) was charged to a 0.5 L glass reactor. The reactor was equipped with an overhead stirrer, thermocouple and nitrogen inlet. Methyl salicylate (6.81 g, 0.045 gmol, 1.5 eq. of succinimide) was added in a single portion at room temperature. The reactor was then purged with a constant nitrogen flow of ~180 mL/min. The reactor agitator was started and titanium isopropoxide (1.62 g, 0.006 gmol) then was added to the reaction mixture via syringe. The reaction mixture was heated to 150° C. for 6 hours. The reaction mixture was then cooled to room temperature.

Example 37

EC Treated PIB Succinimide Dispersant with 1.5 eq. Methyl Phenylacetate

An ethylene carbonate post-treated 2300 MW PIB succinimide (245.81 g, nitrogen content=1.01%) prepared from Ethyleneamine E-100 (nitrogen content=33.7%; $M_n$=250-300 g/mole) was charged to a 0.5 L glass reactor. The reactor was equipped with an overhead stirrer, thermocouple and nitrogen inlet. Methyl phenylacetate (6.11 g, 0.041 gmol, 1.5 eq. of succinimide) was added in a single portion at room temperature. The reactor was then purged with a constant nitrogen flow of ~180 mL/min. The reactor agitator was started and titanium isopropoxide (4.42 g, 0.018 gmol) then was added to the reaction mixture via syringe. The reaction mixture was heated to 150° C. for 12 hours. The reaction mixture was then cooled to room temperature.

Example 38

EC Treated PIB Succinimide Dispersant with 1.6 eq. Ethyl Benzoate

An ethylene carbonate post-treated 2300 MW PIB succinimide (335.17 g, nitrogen content=0.98%) prepared from Ethyleneamine E-100 (nitrogen content=33.7%; $M_n$=250-300 g/mole) was charged to a 0.5 L glass reactor. The reactor was equipped with an overhead stirrer, thermocouple and nitrogen inlet. Ethyl benzoate (8.47 g, 0.056 gmol, 1.6 eq. of succinimide) was added in a single portion at room temperature. The reactor was then purged with a constant nitrogen flow of ~180 mL/min. The reactor agitator was started and titanium isopropoxide (2.01 g, 0.007 gmol) then was added to the reaction mixture via syringe. The reaction mixture was heated to 150° C. for 4 hours. The reaction mixture was then cooled to room temperature.

Example 39

EC Treated PIB Succinimide Dispersant with 1.5 eq. Methyl Benzoate

An ethylene carbonate post-treated 2300 MW PIB succinimide (338.93 g, nitrogen content=1.01%) prepared from Ethyleneamine E-100 (nitrogen content=33.7%; $M_n$=250-300 g/mole) was charged to a 0.5 L glass reactor. The reactor was equipped with an overhead stirrer, thermocouple and nitrogen inlet. Methyl benzoate (7.64 g, 0.056 gmol, 1.5 eq. of succinimide) was added in a single portion at room temperature. The reactor was then purged with a constant nitrogen flow of ~180 mL/min. The reactor agitator was started and titanium isopropoxide (6.00 g, 0.021 gmol) then was added to the reaction mixture via syringe. The reaction mixture was heated to 150° C. for 14 hours. The reaction mixture was then cooled to room temperature.

Example 40

Michael Adduct of δ-Caprolactone-Treated PIB Succinimide Dispersant with 0.7 eq. Carbazole-9-Propionic Acid Methyl Ester To a 4-neck round-bottom flask was added δ-caprolactone post-treated 2300 MW PIB succinimide (98.4 g, nitrogen content=1.19 wt.%) prepared from Ethyleneamine E-100 (nitrogen content=33.7%; $M_n$=250-300 g/mole). The round-bottom flask was then equipped with an overhead stirrer, thermocouple and nitrogen inlet. Carbazole-9-propionic acid methyl ester (2.32 g, 9.2 mmol, 0.7 eq. of succinimide), prepared by a scaled-up method of that described in Example 10, was added in a single portion at room temperature under nitrogen. To this reaction mixture was then added dibutyltin dilaurate (1.01 g, 0.0016 mol) via syringe and reaction mixture heated to 150° C. for 10-12 hours. The reaction mixture was then cooled to room temperature.

Example 41

Michael Adduct of EC-treated Low MW PIB Succinimide Dispersant with 1.5 eq. Carbazole-9-Propionic Acid Methyl Ester To a 4-neck round-bottom flask was added ethylene carbonate post-treated 1300 MW molecular weight PIB succinimide (99.2 g, nitrogen content=2.20 wt. %) prepared from Ethyleneamine E-100 (nitrogen content=33.7%; $M_n$=250-300 g/mole). The round-bottom flask was then equipped with an overhead stirrer, thermocouple and nitrogen inlet. Carbazole-9-propionic acid methyl ester (8.94 g, 35.3 mmol, 1.5 eq. of succinimide), prepared by a scaled-up method of that described in Example 10, was added in a single portion at room temperature under nitrogen. To this reaction mixture was then added dibutyltin dilaurate (1.01 g, 0.0016 mol) via syringe and reaction mixture heated to 150° C. for 10-12 hours. The reaction mixture was then cooled to room temperature.

Formulation Baseline A

A baseline lubricating oil composition was prepared which contained conventional amounts of an oxidation inhibitor package, a calcium-based detergent package containing a phenate and sulfonates, zinc dithiophosphate, viscosity index improver, pour point depressant, foam inhibitor and the balance lube oil.

Comparative Example A

A lubricating oil composition was prepared by adding approximately 6 wt. % of an ethylene carbonate post-treated 2300 MW PIB succinimide to Formulation Baseline A.

High Temperature Corrosion Bench Test (HTCBT)

The lubricating oil compositions using Baseline Formulation A comprising 6 wt. % dispersants of inventive Examples 16, 20, 22-26, 28, 32, 34-35, 38 and Comparative Example A were tested in the high temperature corrosion bench test (HTCBT), according to ASTM D6594, to determine ability of lubricating oil formulations to corrode various metals, specifically alloys of lead and copper commonly used in cam followers and bearings. Four metal specimens of copper, lead, tin and phosphor bronze are immersed in a measured amount of engine oil. The oil, at an elevated temperature (170° C.), is blown with air (5 L/h) for a period of time (168 h). When the test is completed, the metal specimen and the stressed oil are examined to detect corrosion and corrosion products, respectively. The concentrations of metal in the new oil and stressed oil and the respective changes in metal concentrations are reported. To be a pass the concentration of lead should not exceed 120 ppm. The test results for the HTCBT test are summarized below in Table 2.

TABLE 2

| Example | Pb, ppm |
|---|---|
| 16 | 26 |
| 20 | 60 |
| 22 | 34 |
| 23 | 22 |
| 24 | 62 |
| 25 | 54 |

TABLE 2-continued

| Example | Pb, ppm |
|---------|---------|
| 26 | 60 |
| 28 | 80 |
| 32 | 60 |
| 34 | 77 |
| 35 | 40 |
| 38 | 43 |
| Comp. A | 119.5 |

The results demonstrate that all the lubricating oil compositions containing examples of the present disclosure provided improved performance in lead corrosion as compared to the lubricating oil compositions of Comparative Example A.

Soot Thickening Bench Test

The lubricating oil compositions using Baseline Formulation A comprising 6, 4 or 2 wt. % dispersants of the present disclosure and Comparative Example A were evaluated for dynamic viscosity using a soot test which measures the ability of the formulation to disperse and control viscosity increase resulting from the addition of carbon black, a soot surrogate, In this test, glass tubes were charged with 40 g of lubricating oil and affixed to a condenser. Each oil was heated at 200° C. with 115 mL/min of air flow bubbling through the oil for 8 hours. Then, 0.5 g of VULCAN® XC72R carbon black (Cabot Corporation) was added to 12 g of each oxidized oil. The resulting mixture was heated in a 60° C. oven for 16 hours. After removal from the oven, the mixture was stirred for 1 minute and then homogenized using a paint shaker for 30 minutes or using a Resodyn LabRAM II acoustic mixer for 4 minutes to completely disperse the carbon black. The mixture was then heated in a vacuum oven (full vacuum, <25 mm Hg) at 100° C. for 30 minutes. The mixture was removed from the vacuum oven and stirred using a vortex mixer for 30 seconds just prior to measuring viscosity. The dynamic viscosity of each lubricating oil containing carbon black was then measured at 100° C. for 900 seconds at a shear rate of 0.65 $s^{-1}$ on a TA Instruments AR-G2 rheometer using a cone and plate geometry, wherein the cone is stainless steel with a 60 mm diameter and a 2° angle. Sample temperature was controlled with a Peltier plate temperature control system. The dynamic viscosity reported is the value at the end of test (EOT). Lower dynamic viscosity indicates improved soot dispersion. For each set of three measurements on inventive examples, a measurement of Comparative A was run as a reference. The results of the soot test are summarized in Table 3.

TABLE 3

| | EOT Viscosity, Pa · s | | | |
|---|---|---|---|---|
| Example | Formulation at 6 wt. % | Formulation at 4 wt. % | Formulation at 2 wt. % | Comparative A |
| 14 | 1.29 | n.d. | n.d. | 1.65 |
| 15 | 0.47 | 1.01 | 1.68 | 1.18 |
| 16 | 0.15 | 0.78 | 1.69 | 1.29 |
| 17 | 0.03 | 0.44 | 1.21 | 1.26 |
| 18 | 0.03 | 0.34 | 1.27 | 1.60 |
| 19 | 0.79 | 1.17 | 1.70 | 1.19 |
| 20 | 0.46 | 1.01 | 1.64 | 1.42 |
| 21 | 0.06 | 0.61 | 1.25 | 1.28 |
| 22 | 0.36 | 0.71 | 1.06 | 1.14 |

TABLE 3-continued

| | EOT Viscosity, Pa · s | | | |
|---|---|---|---|---|
| Example | Formulation at 6 wt. % | Formulation at 4 wt. % | Formulation at 2 wt. % | Comparative A |
| 23 | 0.96 | 0.97 | 1.30 | 1.10 |
| 30 | 0.93 | 1.29 | n.d. | 1.35 |
| 31 | 0.64 | 0.96 | n.d. | 1.35 |
| 32 | 0.52 | 0.74 | 0.82 | 0.7 |
| 37 | 1.02 | n.d. | n.d. | n.d. |
| 38 | 0.73 | n.d. | n.d. | 0.64 |
| 39 | 0.96 | n.d. | n.d. | n.d. |
| 40 | 0.74 | n.d. | n.d. | 1.65 |
| 41 | 0.03 | n.d. | n.d. | 1.65 |

"n.d" indicates not determined

Soot handling measurements of Examples 15-23 and 30-32 indicated an increase in EOT viscosity with lowering the dispersant treat rate to 4 and 2 wt. %. Baseline formulation A comprising dispersants in Examples 15-23, 30-31, and 40-41 showed similar or improved soot handling performance at same treat rate of 6 wt. % dispersant. Baseline Formulation A comprising dispersants in Examples 15-23 showed similar or improved soot handling performance for treat rates of dispersant reduced to 4 or 2 wt. % demonstrating increased potency of these dispersants in reducing soot-induced viscosity.

What is claimed is:

1. An oil soluble or dispersible dispersant composition comprising the reaction product of:
   (i) a polyalkenyl succinimide post-treated with a post-treating agent selected from the group consisting of an organic carbonate, an epoxide, a lactone, a hydroxyaliphatic carboxylic acid, and combinations thereof; and
   (ii) an acylating agent selected from one of the following structures (a) through (c):

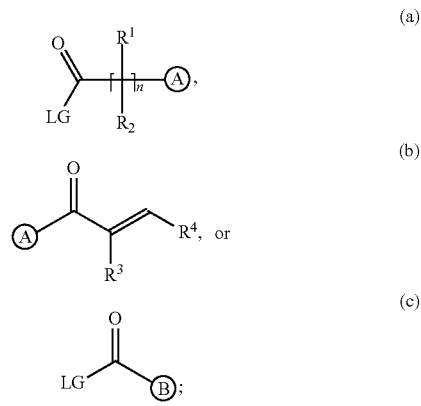

wherein:
LG is a leaving group capable of being displaced in an acylation reaction;
each of $R^1$, $R^2$, $R^3$, and $R^4$ is independently selected from hydrogen, alkyl, and aryl;
n is from 1 to 28;
Ⓐ is an amine moiety; and
Ⓑ is an aromatic, heteroaromatic, alkaryl, or alkheteroaryl moiety having from 4 to 20 carbon atoms.

2. The dispersant composition according to claim 1, wherein the polyalkenyl substituent of the polyalkenyl succinimide has a number average molecular weight of from 500 to 3000.

3. The dispersant composition according to claim 1, wherein the polyalkenyl succinimide is a polyisobutenyl succinimide.

4. The dispersant composition according to claim 1, wherein the organic carbonate comprises one or more of ethylene carbonate, propylene carbonate, butylene carbonate, and glycerine carbonate.

5. The dispersant composition according to claim 1, wherein the epoxide comprises one or more of ethylene oxide, propylene oxide, butylene oxide, styrene oxide, and glycidol.

6. The dispersant composition according to claim 1, wherein the lactone comprises one or more of β-propiolactone, γ-butyrolactone, δ-valerolactone, γ-valerolactone, ε-caprolactone, and δ-caprolactone.

7. The dispersant composition according to claim 1, wherein the hydroxyaliphatic carboxylic acid comprises one or more of glycolic acid, lactic acid, 3-hydroxypropionic acid, and 2,2-bis(hydroxymethyl)propionic acid.

8. The dispersant composition according to claim 1, wherein the acylating agent has the following structure (f):

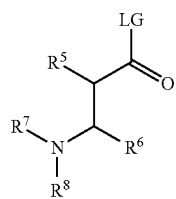
(f)

wherein each of $R^5$ and $R^6$ is independently selected from H, $C_1$-$C_{30}$-alkyl, $C_3$-$C_8$ cycloalkyl, or aryl; and each of $R^7$ and $R^8$ is independently selected from H, $C_1$-$C_{30}$ alkyl, $C_3$-$C_8$ cycloalkyl, aryl, 3-propionyl acid, or 3-propionyl acid ester or when taken together to the nitrogen atom to which they are attached form a nitrogen containing heterocycle.

9. The dispersant composition according to claim 8, wherein the acylating agent is selected from the following structures (g) through (q):

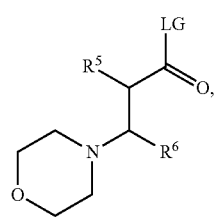
(g)

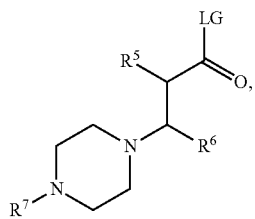
(h)

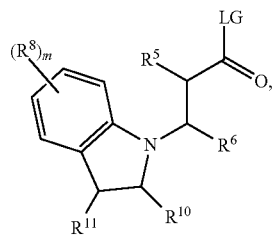
(i)

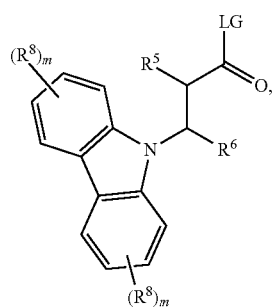
(j)

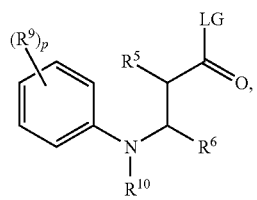
(k)

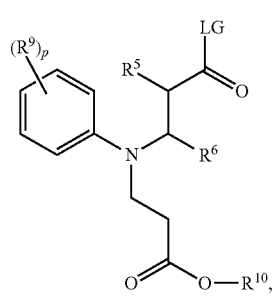
(l)

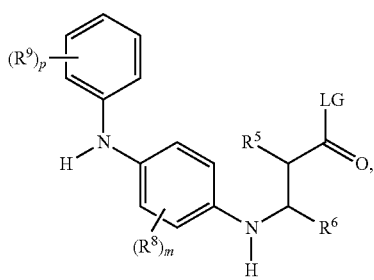
(m)

-continued (n)
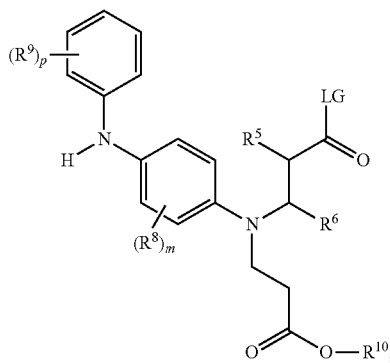

(o)
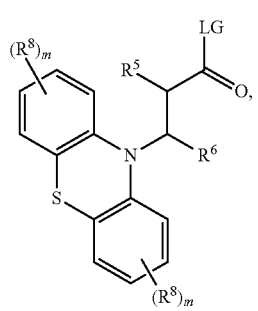

(p)
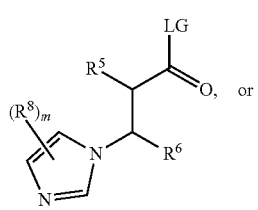

(q)
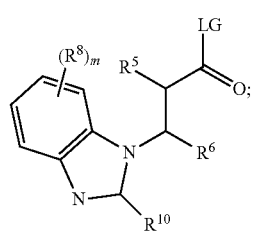

wherein each of R⁵ and R⁶ is independently selected from H, $C_1$-$C_{30}$ alkyl, $C_3$-$C_8$ cycloalkyl, and aryl; and each of $R^7$, $R^8$, $R^9$, $R^{19}$ and $R^{11}$ is independently selected from hydrogen, alkyl, or aryl; m is an integer from 1 to 4; and p is an integer from 1 to 5.

10. The dispersant composition according to claim 8, wherein the acylating agent is selected from one of the following structures (r) through (dd):

(r)
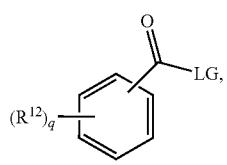

-continued (s)
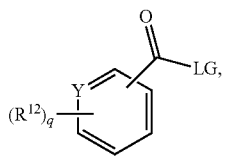

(t)
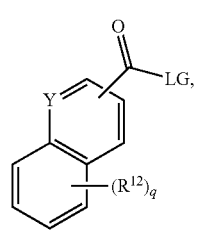

(u)
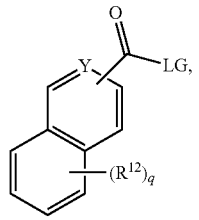

(v)
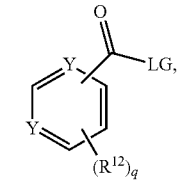

(w)
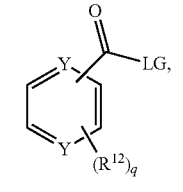

(x)
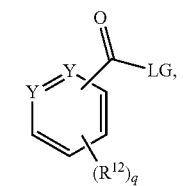

(y)
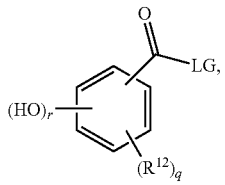

(z)
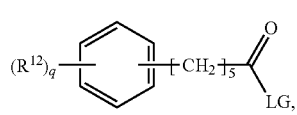

-continued

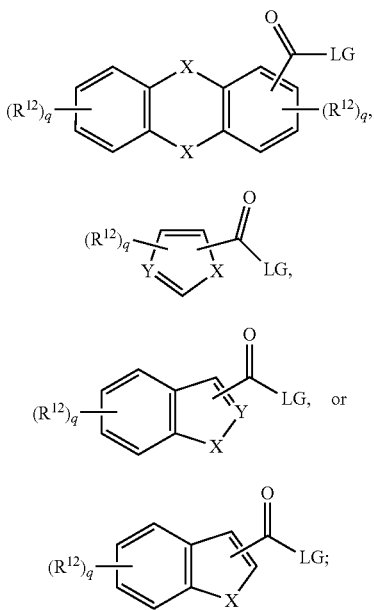

wherein each X is independently selected from $CH_2$, O, S, and NR, where R is H or aryl, heteroaryl, alkyl, alkaryl, or alkheteroaryl; each Y is independently selected from CH and N; each $R^{12}$ is independently selected from H, alkyl and aryl; q is an integer from 0 to 5; r is an integer from 0 to 5; and s is an integer from 1 to 10.

11. The dispersant composition of claim 1, wherein a charge mole ratio of the acylating agent (ii) to the polylalkenyl succinimide (i) is in a range of 0.3:1 to 3:1.

12. A lubricating oil composition comprising (a) a major amount of an oil of lubricating viscosity and (b) from 0.05 to 15 wt. %, based on the total weight of the lubricating oil composition, of the dispersant composition of claim 1.

13. The lubricating oil composition of claim 12, further comprising at least one additive selected from the group consisting of demulsifiers, detergents, dispersants, extreme pressure agents, foam inhibitors, friction modifiers, multi-functional additives, oxidation inhibitors, pour point depressants, rust inhibitors, wear inhibitors, and combinations thereof.

14. A lubricating oil additive concentrate comprising from 80 to 20 wt. % of an organic liquid diluent and from 20 to 80 wt. % of the dispersant composition of claim 1.

15. A method for controlling soot-induced viscosity increase in a compression ignition engine lubricated with a lubricating oil by using as the lubricating oil the lubricating oil composition of claim 12.

16. A method for improving lead corrosion performance in a compression ignition engine lubricated with a lubricating oil by using as the lubricating oil the lubricating oil composition of claim 12, wherein the lubricating oil is one that is determined to be corrosive to lead according to the High Temperature Corrosion Bench Test ASTM D6594 when the dispersant composition is not present.

* * * * *